(12) United States Patent
Gratzer

(10) Patent No.: US 10,005,546 B2
(45) Date of Patent: *Jun. 26, 2018

(54) SPLIT BLENDED WINGLET

(71) Applicant: Aviation Partners, Inc., Seattle, WA (US)

(72) Inventor: Louis B. Gratzer, Seattle, WA (US)

(73) Assignee: Aviation Partners, Inc., Seattle, WA (US)

( * ) Notice: Subject to any disclaimer, the term of this patent is extended or adjusted under 35 U.S.C. 154(b) by 131 days.

This patent is subject to a terminal disclaimer.

(21) Appl. No.: 15/090,541

(22) Filed: Apr. 4, 2016

(65) Prior Publication Data

US 2016/0214706 A1    Jul. 28, 2016

Related U.S. Application Data

(63) Continuation of application No. 14/452,424, filed on Aug. 5, 2014, now Pat. No. 9,302,766, which is a
(Continued)

(51) Int. Cl.
*B64C 23/06* (2006.01)

(52) U.S. Cl.
CPC .......... *B64C 23/065* (2013.01); *B64C 23/069* (2017.05); *Y02T 50/164* (2013.01)

(58) Field of Classification Search
CPC ... B64C 2700/6295; B64C 39/00; B64C 3/14; B64C 23/065; B64C 23/069;
(Continued)

(56) References Cited

U.S. PATENT DOCUMENTS 994,968 A    6/1911   Barbaudy
1,050,222 A  1/1913   McIntosh
(Continued)

FOREIGN PATENT DOCUMENTS

CN    1845848 A    10/2006
CN    101596934 A  12/2009
(Continued)

OTHER PUBLICATIONS

CA 2,728,765 filed Dec. 20, 2010 Examination Report dated May 6, 2016.
(Continued)

*Primary Examiner* — Medhat Badawi
(74) *Attorney, Agent, or Firm* — Rutan & Tucker, LLP

(57) ABSTRACT

A split winglet configured for attachment to a wing tip of a wing. The split winglet may include an upper winglet extending from the wing tip above a chord plane of the wing and a ventral fin projecting below the chord plane. The upper winglet and the ventral fin may include tip configurations. At least one of the upper winglet tip configuration and the ventral fin tip configuration may be provided by a curved blade cap attached thereto. The curved blade cap may include a leading edge having a first curve with a first radius, and a trailing edge having a second curve with a second radius different from the first radius. The curved blade cap may also include a distal segment oblique to the first curve and the second curve.

19 Claims, 14 Drawing Sheets

Related U.S. Application Data continuation-in-part of application No. 13/493,843, filed on Jun. 11, 2012, now Pat. No. 8,944,386, and a continuation-in-part of application No. 12/488,488, filed on Jun. 19, 2009, now Pat. No. 9,381,999.

(60) Provisional application No. 61/495,236, filed on Jun. 9, 2011, provisional application No. 61/074,395, filed on Jun. 20, 2008.

(58) Field of Classification Search
CPC ... B64C 2700/6233; B64C 23/00; B64C 3/10; F04D 29/384; F04D 29/30; F04D 29/324; Y02T 50/166; Y02T 50/12; Y02T 50/164; Y02T 50/162; Y02T 50/44; Y02T 50/32
See application file for complete search history.

(56) References Cited

U.S. PATENT DOCUMENTS

| | | | |
|---|---|---|---|
| 1,692,081 | A | 11/1928 | De La Cierva |
| 1,710,673 | A | 4/1929 | Bonney |
| 1,841,921 | A | 1/1932 | Spiegel |
| 2,123,096 | A | 7/1938 | Charpentier |
| 2,576,981 | A | 12/1951 | Vogt |
| 2,775,419 | A | 12/1956 | Hlobil |
| 2,805,830 | A | 9/1957 | Zborowski |
| 2,846,165 | A | 8/1958 | Axelson |
| 3,029,018 | A | 4/1962 | Floyd, Jr. |
| 3,128,371 | A | 4/1964 | Spaulding et al. |
| 3,270,988 | A | 9/1966 | Cone, Jr. |
| 3,778,926 | A | 12/1973 | Gladych |
| 4,017,041 | A | 4/1977 | Nelson |
| 4,093,160 | A | 6/1978 | Reighart, II |
| 4,108,403 | A | 8/1978 | Finch |
| 4,172,574 | A | 10/1979 | Spillman |
| 4,190,219 | A | 2/1980 | Hackett |
| 4,205,810 | A | 6/1980 | Ishimitsu |
| 4,240,597 | A | 12/1980 | Ellis et al. |
| 4,245,804 | A | 1/1981 | Ishimitsu et al. |
| 4,247,062 | A | 1/1981 | Brueckner |
| D259,554 | S | 6/1981 | Parise et al. |
| 4,365,773 | A | 12/1982 | Wolkovitch |
| 4,429,844 | A | 2/1984 | Brown et al. |
| 4,444,365 | A | 4/1984 | Heuberger |
| 4,541,593 | A | 9/1985 | Cabrol |
| 4,545,552 | A | 10/1985 | Welles |
| 4,598,885 | A | 7/1986 | Waitzman |
| 4,605,183 | A | 8/1986 | Gabriel |
| 4,671,473 | A | 6/1987 | Goodson |
| 4,674,709 | A | 6/1987 | Welles |
| 4,714,215 | A | 12/1987 | Jupp et al. |
| 4,722,499 | A | 2/1988 | Klug |
| 4,949,919 | A | 8/1990 | Wajnikonis |
| 5,039,032 | A | 8/1991 | Rudolph |
| 5,102,068 | A | 4/1992 | Gratzer |
| 5,156,358 | A | 10/1992 | Gerhardt |
| 5,275,358 | A | 1/1994 | Goldhammer et al. |
| 5,348,253 | A | 9/1994 | Gratzer |
| 5,407,153 | A | 4/1995 | Kirk et al. |
| 5,634,613 | A | 6/1997 | McCarthy |
| 5,961,068 | A | 10/1999 | Wainfan et al. |
| 5,992,793 | A | 11/1999 | Perry et al. |
| 6,089,502 | A | 7/2000 | Herrick et al. |
| 6,227,487 | B1 | 5/2001 | Clark |
| 6,260,809 | B1 | 7/2001 | Egolf et al. |
| 6,345,790 | B1 | 2/2002 | Brix |
| 6,474,604 | B1 | 11/2002 | Carlow |
| 6,484,968 | B2 | 11/2002 | Felker |
| 6,578,798 | B1 | 6/2003 | Dizdarevic et al. |
| 6,722,615 | B2 | 4/2004 | Heller et al. |
| 6,827,314 | B2 | 12/2004 | Barriety |
| 6,886,778 | B2 | 5/2005 | McLean |
| 6,926,345 | B2 | 8/2005 | Ortega et al. |
| 7,275,722 | B2 | 10/2007 | Irving et al. |
| 7,475,848 | B2 | 1/2009 | Morgenstern et al. |
| D595,211 | S | 6/2009 | Cazals |
| 7,597,285 | B2 | 10/2009 | Schweiger |
| 7,644,892 | B1 | 1/2010 | Alford, Jr. et al. |
| 7,744,038 | B2 | 6/2010 | Sankrithi et al. |
| 7,900,876 | B2 | 3/2011 | Eberhardt |
| 7,900,877 | B1 | 3/2011 | Guida |
| 7,971,832 | B2 | 7/2011 | Hackett et al. |
| 7,980,515 | B2 | 7/2011 | Hunter |
| 7,988,099 | B2 | 8/2011 | Bray |
| 7,988,100 | B2 | 8/2011 | Mann |
| 7,997,875 | B2 | 8/2011 | Nanukuttan et al. |
| 8,123,160 | B2 | 2/2012 | Shepshelovich et al. |
| 8,241,002 | B2 | 8/2012 | Wobben |
| 8,342,456 | B2 | 1/2013 | Mann |
| 8,366,056 | B2 | 2/2013 | Garang |
| 8,439,313 | B2 | 5/2013 | Rawdon et al. |
| 8,444,389 | B1 | 5/2013 | Jones et al. |
| 8,490,925 | B2 | 7/2013 | Buescher et al. |
| 8,944,386 | B2 | 2/2015 | Gratzer |
| 9,038,963 | B2 | 5/2015 | Gratzer |
| 9,580,170 | B2 | 2/2017 | Gratzer |
| 2002/0092947 | A1 | 7/2002 | Felker |
| 2002/0162917 | A1 | 11/2002 | Heller et al. |
| 2004/0169110 | A1 | 9/2004 | Wyrembek et al. |
| 2005/0173592 | A1 | 8/2005 | Houck |
| 2007/0018037 | A1 | 1/2007 | Perlo et al. |
| 2007/0114327 | A1 | 5/2007 | Dees et al. |
| 2007/0131821 | A1 | 6/2007 | Johan |
| 2007/0252031 | A1 | 11/2007 | Hackett et al. |
| 2008/0116322 | A1 | 5/2008 | May |
| 2008/0191099 | A1 | 8/2008 | Werthmann et al. |
| 2008/0308683 | A1 | 12/2008 | Sankrithi et al. |
| 2009/0039204 | A1* | 2/2009 | Eberhardt ............ B64C 23/069 244/199.4 |
| 2009/0065632 | A1* | 3/2009 | Cazals ................. B64C 5/02 244/15 |
| 2009/0084904 | A1* | 4/2009 | Detert ................. B64C 23/065 244/199.4 |
| 2009/0148301 | A1 | 6/2009 | Leahy et al. |
| 2009/0256029 | A1* | 10/2009 | Malachowski ....... B64C 23/069 244/199.4 |
| 2009/0302167 | A1* | 12/2009 | Desroche ................. B64C 3/58 244/199.4 |
| 2010/0006706 | A1 | 1/2010 | Breitsamter et al. |
| 2010/0019094 | A1 | 1/2010 | Theurich et al. |
| 2010/0123047 | A1 | 5/2010 | Williams |
| 2010/0163670 | A1 | 7/2010 | Dizdarevic et al. |
| 2010/0181432 | A1 | 7/2010 | Gratzer |
| 2011/0024556 | A1 | 2/2011 | Cazals et al. |
| 2011/0192937 | A1 | 8/2011 | Buescher et al. |
| 2011/0272530 | A1 | 11/2011 | Mann |
| 2012/0049007 | A1 | 3/2012 | Hunter |
| 2012/0049010 | A1 | 3/2012 | Speer |
| 2012/0091262 | A1 | 4/2012 | Rawdon et al. |
| 2012/0187251 | A1 | 7/2012 | Guida |
| 2012/0286102 | A1 | 11/2012 | Sinha et al. |
| 2012/0286122 | A1 | 11/2012 | Tankielun et al. |
| 2012/0312928 | A1 | 12/2012 | Gratzer |
| 2012/0312929 | A1 | 12/2012 | Gratzer |
| 2013/0092797 | A1 | 4/2013 | Wright et al. |
| 2013/0256460 | A1 | 10/2013 | Roman et al. |
| 2014/0346281 | A1 | 11/2014 | Gratzer |
| 2015/0217858 | A1 | 8/2015 | Gratzer |
| 2016/0368595 | A1 | 12/2016 | Gratzer |
| 2017/0057622 | A1 | 3/2017 | Gratzer |

FOREIGN PATENT DOCUMENTS

| | | | |
|---|---|---|---|
| DE | 2149956 | A1 | 4/1973 |
| DE | 3638347 | A1 | 5/1988 |
| DE | 19752369 | A1 | 5/1999 |
| DE | 20211664 | U1 | 1/2003 |
| DE | 10207767 | | 9/2003 |
| EP | 0094064 | A1 | 11/1983 |
| EP | 0122790 | A1 | 10/1984 |
| EP | 1375342 | B1 | 1/2004 |
| EP | 1924493 | B1 | 5/2008 |

(56) References Cited

FOREIGN PATENT DOCUMENTS

| EP | 2084059 B1 | 8/2009 |
|---|---|---|
| EP | 1883577 B1 | 1/2010 |
| EP | 2274202 B1 | 1/2011 |
| EP | 2610169 B1 | 7/2013 |
| EP | 2792595 A1 | 10/2014 |
| EP | 2881321 A1 | 6/2015 |
| FR | 418656 A | 12/1910 |
| FR | 444080 A | 10/1912 |
| FR | 726674 A | 6/1932 |
| GB | 2282996 A | 4/1995 |
| WO | 1982004426 A1 | 12/1982 |
| WO | 1995011159 A1 | 4/1995 |
| WO | 2002047979 | 6/2002 |
| WO | 20030000547 A1 | 1/2003 |
| WO | 2005099380 A2 | 10/2005 |
| WO | 2007031732 A1 | 3/2007 |
| WO | 2008061739 A1 | 5/2008 |
| WO | 2009/155584 A1 | 12/2009 |
| WO | 2010124877 A1 | 11/2010 |
| WO | 2012007358 A1 | 1/2012 |
| WO | 2012171034 A1 | 12/2012 |
| WO | 2013007396 A1 | 1/2013 |

OTHER PUBLICATIONS

CN 2012800388393 filed Feb. 8, 2014 Telephone Notice dated May 9, 2016.
CN 2012800388393 filed Feb. 8, 2014 Third Office Action dated Jan. 18, 2016.
CN 201410594345.4 filed Oct. 29, 2014 First Office Action dated Jan. 12, 2016.
CN 201410594345.4 filed Oct. 29, 2014 Office Action dated Sep. 1, 2016.
EP 09767892.4 filed Jan. 18, 2011 Notice of Opposition Appendix A dated Jul. 2016.
EP 09767892.4 filed Jan. 18, 2011 Notice of Opposition filed against EP2302685 dated Jul. 26, 2016.
EP 09767892.4 filed Jan. 18, 2011 Notice of Opposition supporting document D10 "Wingtip Comparison" dated Dec. 1978.
EP 09767892.4 filed Jan. 18, 2011 Notice of Opposition supporting document D13 "The ETA glider wingtip.pdf" dated Jun. 2006.
EP 09767892.4 filed Jan. 18, 2011 Notice of Opposition supporting document D13A "State of the project" dated Jun. 2016.
EP 09767892.4 filed Jan. 18, 2011 Notice of Opposition supporting document D13B "Sales Information" dated Jun. 2016.
EP 09767892.4 filed Jan. 18, 2011 Notice of Opposition supporting document D2 "Wingtip Design" dated Mar. 1984.
EP 09767892.4 filed Jan. 18, 2011 Notice of Opposition supporting document D5 "Flight Magazine" dated Nov. 1911.
EP 09767892.4 filed Jan. 18, 2011 Notice of Opposition supporting document D9 "Wing Tip Design" dated Dec. 1978.
EP 09767892.4 filed Jan. 18, 2011 Response to Opposition and Opponent's Observations dated Mar. 31, 2017.
EP 12 797 495.4 filed Dec. 19, 2013 Intent to Grant dated Sep. 18, 2017.
U.S. Appl. No. 14/610,452, filed Jan. 30, 2015 Examiner's Answer dated Oct. 7, 2016.
U.S. Appl. No. 15/256,719, filed Sep. 5, 2016 Notice of Allowance dated Oct. 27, 2016.
Boeing MD-80 Technical Specification, May 2011.
CA 2,728,765 First Examination Report dated Jun. 4, 2015.
CN 200980132637.3 filed Feb. 21, 2011 First Office Action dated Dec. 25, 2012.
CN 200980132637.3 filed Feb. 21, 2011 Second Office Action dated Aug. 19, 2013.
CN 200980132637.3 filed Feb. 21, 2011 Third Office Action dated Apr. 10, 2014.
CN 201280038839.3 filed Feb. 8, 2014 First Office Action dated Feb. 2, 2015.
CN 201280038839.3 filed Feb. 8, 2014 Second Office Action dated Sep. 17, 2015.
CN 201280038841.0 filed Feb. 8, 2014 First Office Action dated Jan. 29, 2015.
CN 201280038841.0 filed Feb. 8, 2014 Second Office Action dated Sep. 28, 2015.
EP 09767892.4 Extended European Search Report dated Aug. 30, 2013.
EP 12 796 526.7 filed Jan. 8, 2014 Extended European Search Report dated Feb. 26, 2015.
EP 12 797 495.4 filed Dec. 19, 2013 Extended European Search Report dated Mar. 5, 2015.
EP 13161204.6 filed Jul. 7, 2011 European Search Report dated May 17, 2013.
EP 14198530.9 filed Dec. 17, 2014 Extended European Search Report dated May 12, 2015.
Gilkey, R. D. et al., "Design and Wind Tunnel Tests of Winglets on a DC-10 WIng," Apr. 1979, 52 pages.
Jameson, A., "Aerodynamic Design," Prceedings Computational Science for the 21st Centuty, May 1997, 16 pages.
Jameson, Antony, "Re-Engineering the Design Process Through Computation," Journal of Aircraft, vol. 36, No. 1, Jan.-Feb. 1999, pp. 36-50.
Kroo, I., "Nonplanar Wing Concepts for Increased Aircraft Efficiency," CKI Lecture Series on Innovative Configurations and Advanced Concepts for Future Civil Aircraft, Jun. 6-10, 2005.
McDonnell Douglas Press Release, "McDonnell Douglas Unveils New MD-XX Trijet Design," Sep. 4, 1996, 1 page.
Nangia, R. J. et al., "Aerodynamic Design Studies of Conventional & Unconventional Wings with Winglets," 24th Applied Aerodynamics Conference, Jun. 5-8, 2006, 18 pages.
Norris, Guy et al., "Shaping Up," Aviation Week, May 7, 2012, pp. 37-38, vol. 174, No. 16.
PCT/EP2011/061552 filed Jul. 7, 2011 International Search Report and Written Opinion dated Oct. 7, 2011.
PCT/US2009/048065 filed Jun. 19, 2009 International Search Report dated Aug. 17, 2009.
PCT/US2009/048065 filed Jun. 19, 2009 Written Opinion and International Preliminary Report on Patentability dated Aug. 17, 2009.
PCT/US2012/041936 filed Jun. 11, 2012 International Search Report and Written Opinion dated Aug. 31, 2012.
PCT/US2012/041961 filed Jun. 11, 2012 International Preliminary Report on Patentability dated Dec. 27, 2013.
PCT/US2012/041961 filed Jun. 11, 2012 International Search Report and Written Opinion dated Sep. 6, 2012.
PCT/US2015/043819 filed Aug. 5, 2015 International Search Report and Written Opinion dated Oct. 16, 2015.
Starlionblue (Jun. 10, 2009) Could Boeing Reconsider the MD-12? [Msg 11]. Message posted to http://www.airliners.net/aviation-forums/general_aviation/read.main/4443449/2/#menu27.
Tibbits, George (May 16, 1992) Superjumbo Jets Are Ocean Liners for the Skies. Casa Grande Arizona Dispatch, p. 12.
Trucchi, Marco, "Fluid Mechanics of Yacht Keels," Dec. 18, 1996.
U.S. Appl. No. 12/488,488, filed Jun. 19, 2009 Advisory Action dated Feb. 27, 2013.
U.S. Appl. No. 12/488,488, filed Jun. 19, 2009 Final Office Action dated Dec. 6, 2012.
U.S. Appl. No. 12/488,488, filed Jun. 19, 2009 Final Office Action dated Feb. 14, 2012.
U.S. Appl. No. 12/488,488, filed Jun. 19, 2009 Non-Final Office Action dated Jul. 3, 2012.
U.S. Appl. No. 12/488,488, filed Jun. 19, 2009 Non-Final Office Action dated Oct. 13, 2011.
U.S. Appl. No. 13/493,843, filed Jun. 11, 2012 Advisory Action dated Apr. 21, 2014.
U.S. Appl. No. 13/493,843, filed Jun. 11, 2012 Final Office Action dated Feb. 14, 2014.
U.S. Appl. No. 13/493,843, filed Jun. 11, 2012 Final Office Action dated Sep. 26, 2014.
U.S. Appl. No. 13/493,843, filed Jun. 11, 2012 Non-Final Office Action dated Jun. 11, 2014.

(56) References Cited

OTHER PUBLICATIONS

U.S. Appl. No. 13/493,843, filed Jun. 11, 2012 Non-Final Office Action dated Oct. 7, 2013.
U.S. Appl. No. 13/493,915, filed Jun. 11, 2012 Advisory Action dated Nov. 19, 2014.
U.S. Appl. No. 13/493,915, filed Jun. 11, 2012 Non-Final Office Action dated May 23, 2014.
U.S. Appl. No. 13/493,915, filed Jun. 11, 2012 Non-Final Office Action dated Sep. 11, 2014.
U.S. Appl. No. 14/452,424, filed Aug. 5, 2014 Non-Final Office Action dated Aug. 13, 2015.
U.S. Appl. No. 14/610,452, filed Jan. 30, 2015 Final Office Action dated Feb. 1, 2016.
U.S. Appl. No. 14/610,452, filed Jan. 30, 2015 Non-Final Office Action dated Sep. 24, 2015.
Whitcomb, Richard T., "A Design Approach and Selected Wind-Tunnel Results at High Subsonic Speeds for Wing-Tip Mounted Winglets," NASA Technical Note, Jul. 1976.
Wilhelm, Steve, "Winglet's Split Personality," Puget Sound Business Journal, Aug. 16-22, 2013.
EP 15830283.6 filed Feb. 16, 2017 Extended European Search Report dated Nov. 27, 2017.

\* cited by examiner

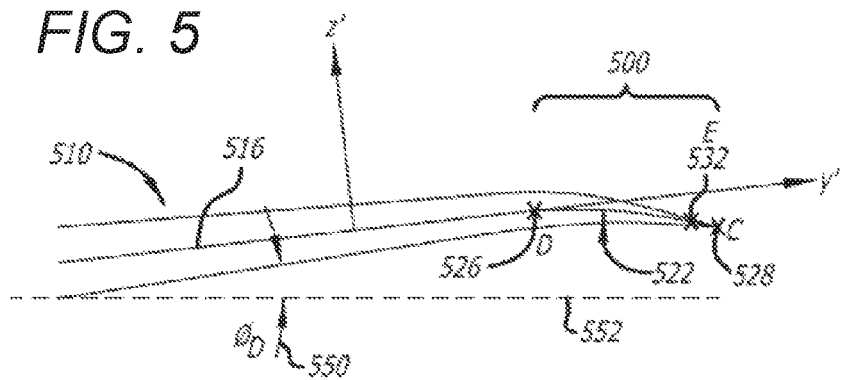
FIG. 5
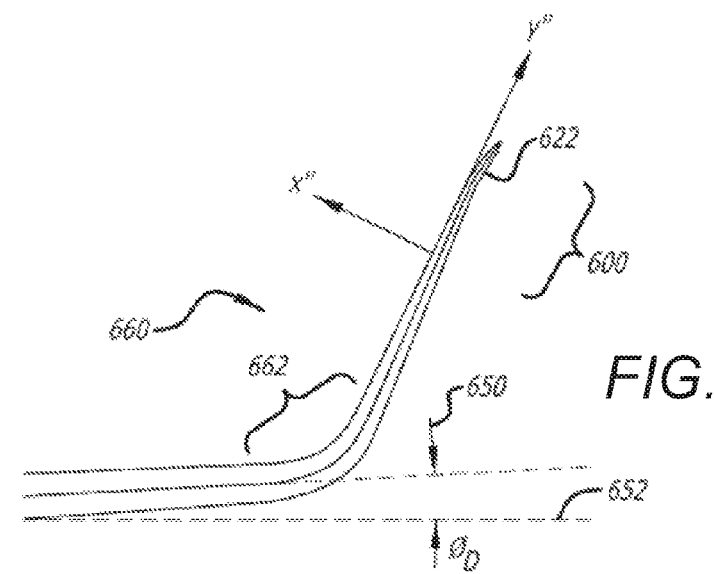
FIG. 6A
FIG. 6B

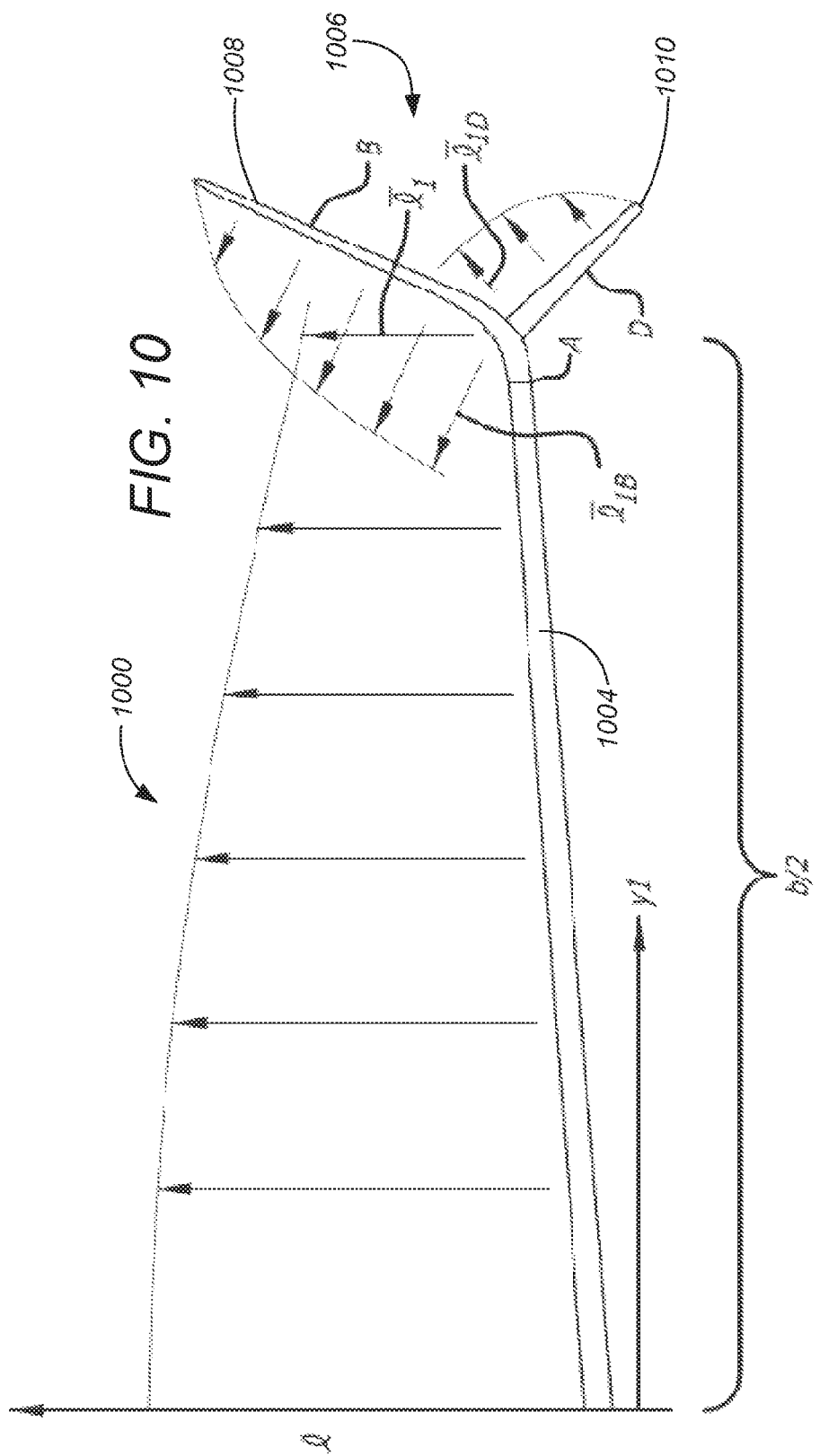

SPLIT BLENDED WINGLET

PRIORITY

This application is a continuation of U.S. patent application Ser. No. 14/452,424, filed Aug. 5, 2014, now U.S. Pat. No. 9,302,766, which is: 1) a continuation-in-part of U.S. patent application Ser. No. 12/488,488, filed Jun. 19, 2009, now U.S. Pat. No. 9,381,999, which claims the benefit of U.S. Provisional Application No. 61/074,395, filed Jun. 20, 2008, and 2) a continuation-in-part of U.S. patent application Ser. No. 13/493,843, filed Jun. 11, 2012, now U.S. Pat. No. 8,944,386, which claims the benefit of U.S. Provisional Application No. 61/495,236, filed Jun. 9, 2011. Each of the aforementioned applications is incorporated by reference in its entirety into this application.

BACKGROUND

All aircraft wings experience drag as they move through the air. The experienced drag may be separated into three components: induced drag, parasitic drag, and compressibility drag. Induced drag depends on the lift force carried by the lifting surfaces. Parasitic drag arises from contact between a moving surface and the fluid and includes such factors as the object form, skin friction, and interference factors. Compressibility drag is the drag associated with higher Mach numbers, which may include viscous and vortex drag, shock-wave drag, and any drag due to shock-induced separations, all of which may vary with Mach number. Of these, the induced drag has traditionally shown the greatest potential for improvement through the use of winglets or other wing tip devices.

Generally, an aircraft's wing may be swept to reduce compressibility drag effects on high-speed airplanes. A swept wing is generally designed so the angle between the aircraft's body and the wing is oblique, and specifically is swept toward the aft of the aircraft. The sweep of the wing's leading edge and trailing edge does not necessarily have to be at the same angle. A wing tip device may also be added to further reduce the drag on the wing. One alternative is to provide a raked wing tip. A raked wing tip conventionally has a higher degree of sweep than the rest of the wing. Winglets are also an alternative solution, generally used to increase the effective aspect ratio of a wing, with less structural impact than adding wingspan. Winglets are generally near vertical extensions of the wing tip. Wing tip devices may increase the lift generated at the wing tip, and reduce the induced drag caused by wingtip vortices, improving the lift-to-drag ratio. Although winglets reduce drag generated by wingtip vortices, winglets produce lift that increases the bending moment on the wing.

Various wing tip devices and geometries are described, for example, in US 2007/0252031 (titled "Wing Tip Devices," published Nov. 1, 2007), US 2007/0114327 (titled "Wing Load Alleviation Apparatus and Method," published May 24, 2007), U.S. Pat. No. 6,722,615 (titled "Wing Tip Extension for a Wing," issued Apr. 20, 2004), U.S. Pat. No. 6,827,314 (titled "Aircraft with Active Control of the Warping of Its Wings," issued Dec. 7, 2004), U.S. Pat. No. 6,886,778 (titled "Efficient Wing Tip Devices and Methods for Incorporating such Devices into Existing Wing Designs," issued May 3, 2005), U.S. Pat. No. 6,484,968 (titled "Aircraft with Elliptical Winglets," issued Nov. 26, 2002), and U.S. Pat. No. 5,348,253 (titled "Blended Winglet," issued Sep. 20, 1994), each of which is incorporated by reference into this application as if fully set forth herein.

SUMMARY

Embodiments described herein may be applied to a wing or winglet incorporating a tip device with a curved leading edge and a curved trailing edge to minimize induced drag for a given wing form. The curved leading edge is designed to achieve optimal results such as, for example, maintaining attached flow, minimizing flow separation, and minimizing premature vortex roll-up, while the curved trailing edge is designed to achieve optimal results such as, for example, keeping the chord distribution consistent with an elliptic loading over the planform. The curve of the leading and trailing tip sections may be described generally as parabolic, and preferably as super elliptic. A finite tip segment may be included with a sweep angle approximate to the trailing edge sweep angle. This finite section may be used to assist in stabilizing the tip vorticity and maintain the vortex position close to the extreme wing tip.

Aerodynamic loading may be important to achieving optimum wing performance; however, the effect of the actual loading obtained in flight at a wing tip is usually overlooked. Failure to achieve the optimum elliptic loading, particularly near the tip of the wing, may lead to premature tip vortex formation and a corresponding increase of induced drag. This characteristic may also apply to planar wings where premature tip vortex roll-up, inboard of the wing tip, is frequently visible as a condensation trail in flight.

Embodiments described herein may be applied to the tip of a flat wing or to a winglet. However, aspects of the design may be applied to lifting surfaces in general, and particularly to dynamic lifting surfaces. Alternatively, aeronautical propulsion systems, including, for example, propellers and helicopters rotors, may alternatively benefit equally from aspects of the design and are additionally considered within the scope of the invention. Embodiments described herein may also apply to any applications which use either static or dynamic lifting surfaces such as ship propellers.

Embodiments described herein comprise an innovative winglet concept including a split winglet, which includes separate extensions above and below the wing chord plane. The split winglet includes an upward sloping element similar to an existing winglet and a down-ward canted element (ventral fin). The ventral fin counters vortices generated by interactions between the wingtip and the lower wing surface.

The split winglet is designed to reduce drag but without generating the increased bending moment found in existing winglet designs. The split winglet design is believed to improve fuel burn or reduce fuel burn by approximately 1.5%, reduce drag by up to 9.5% over a wing with a standard tip, and improve cruise performance by more than 40% over existing blended-winglet configurations.

Embodiments as described herein are adaptable to various wing and wing tip designs. Embodiments may include an integrated split blended winglet that attaches as a single unit at a wing tip, and may include a separate ventral fin designed to attach to an existing blended winglet.

An apparatus is provided herein for a split winglet configured for attachment to a wing tip of an airplane. The split winglet comprises an upper winglet extending from the wing tip above a chord plane of the wing and a ventral fin projecting below the chord plane from a lower surface of the upper winglet. Generally, the upper winglet further comprises a transition section which curves upward from the wing tip into a substantially planar section. In an embodiment, the ventral fin projects below the chord plane from substantially at or near the midpoint of the transition section. An upper surface and the lower surface of the upper winglet are respective smooth extensions of an upper surface and a lower surface of the wing tip. The upper surface and the lower surface of the upper winglet are bounded by a leading edge and a trailing edge. The leading edge and the trailing edge generally are linear sections which are swept toward an airstream direction substantially parallel with the root chord and converging at an upper winglet tip configuration. In an embodiment, the leading and trailing edges of the upper winglet respectively are continuous extensions of a leading edge and a trailing edge of the wing. The upper winglet tip configuration comprises the leading and trailing edges curving toward the airstream direction and then converging to substantially a point distal of the wing tip of the airplane. Similarly, the ventral fin comprises an upper surface and a lower surface bounded by a leading edge and a trailing edge both converging at a ventral fin tip configuration comprising the leading and trailing edges curving toward the airstream direction and then terminating at substantially a point distal of the wing tip of the airplane. In one embodiment, the leading edge of the ventral fin merges into the lower surface of the upper winglet distal of the leading edge of the upper winglet, and the trailing edge of the ventral fin merges into the trailing edge of the upper winglet. In another embodiment, the leading edge of the upper winglet and the leading edge of the ventral fin merge together at the transition section, such that the leading edges of the upper winglet and the ventral fin are continuous extensions of the leading edge of the wing. Similarly, the trailing edge of the upper winglet and the trailing edge of the ventral fin may merge together at the transition section, such that the trailing edges of the upper winglet and the ventral fin are continuous extensions of the trailing edge of the wing.

In an exemplary embodiment, a split winglet configured for attachment to a wing tip of an airplane comprises an upper winglet extending from the wing tip above a chord plane of the wing. The upper winglet comprising an upper surface and a lower surface bounded by a leading edge and a trailing edge, the leading edge and the trailing edge converging to an upper winglet tip configuration. A ventral fin projecting from the lower surface of the upper winglet comprises an upper surface and a lower surface bounded by a leading edge and a trailing edge extending below the chord plane. The leading edge and the trailing edge converging to a ventral fin tip configuration. The upper surface and the lower surface of the upper winglet respectively merge with an upper surface and a lower surface of the wing.

In another exemplary embodiment, the leading edge and the trailing edge of the upper winglet comprise substantially linear sections which are swept toward an airstream direction being substantially parallel with the root chord and then converge to the upper winglet tip configuration. In another exemplary embodiment, the upper winglet tip configuration comprises the leading edge and the trailing edge curving toward the airstream direction and then converging to substantially a point distal of the wing tip of the airplane. In another exemplary embodiment, the upper winglet tip configuration comprises a curve of the leading edge having a first radius and a curve of the trailing edge having a second radius, wherein the first radius and the second radius orient the leading and trailing edges toward the airstream direction so as to converge to substantially a point distal of the wing tip of the airplane.

In another exemplary embodiment, the leading edge and the trailing edge of the ventral fin comprise substantially linear sections which are swept toward an airstream direction being substantially parallel with the root chord and then converge to the ventral fin tip configuration. In another exemplary embodiment, the ventral fin tip configuration comprises the leading edge and the trailing edge curving toward the airstream direction and then converging to substantially a point distal of the wing tip of the airplane.

In another exemplary embodiment, the upper winglet further comprises a transition section which curves upward from the wing tip into a substantially planar section, such that the upper surface and the lower surface of the upper winglet respectively are smooth extensions of the upper and lower surfaces of the wing tip, and such that the leading and trailing edges of the upper winglet respectively are continuous extensions of a leading edge and a trailing edge of the wing. In another exemplary embodiment, the transition section comprises a substantially constant radius of curvature between the wing tip and the planar section. In another exemplary embodiment, the transition section comprises one or more radii of curvature disposed along a length of the transition section between the wing tip and the planar section. In another exemplary embodiment, the transition section comprises a substantially nonlinear curvature along a length of the transition section between the wing tip and the planar section. In another exemplary embodiment, the ventral fin projects from the lower surface of the transition section and extends below the chord plane. In another exemplary embodiment, the leading edge of the ventral fin merges into the lower surface of the upper winglet distal of the leading edge of the upper winglet. In another exemplary embodiment, the trailing edge of the ventral fin merges into the trailing edge of the upper winglet. In another exemplary embodiment, the leading edge of the upper winglet and the leading edge of the ventral fin merge together at the transition section, such that the leading edge of the upper winglet and the leading edge of the ventral fin are continuous extensions of the leading edge of the wing. In another exemplary embodiment, the trailing edge of the upper winglet and the trailing edge of the ventral fin merge together at the transition section, such that the trailing edge of the upper winglet and the trailing edge of the ventral fin are continuous extensions of the trailing edge of the wing.

In an exemplary embodiment, a wing tip of an airplane comprises an upper winglet extending from the wing tip above a chord plane of the wing and converging at an upper tip configuration comprising a curving of the upper winglet toward an airstream direction being substantially parallel with the root chord. A ventral fin projecting below the chord plane from the upper winglet and converging at a ventral fin tip configuration comprising a curving of the ventral fin toward the airstream direction.

In another exemplary embodiment, the upper winglet comprises an upper surface and a lower surface proximally bounded by a leading edge and distally bounded by a trailing edge, the leading and trailing edges being swept toward the airstream direction, wherein the upper surface and the lower surface are smooth extensions of an upper surface and a lower surface of the wing. In another exemplary embodiment, the upper winglet further comprises a curved transition section extending from the wing to a substantially planar section converging at the upper tip configuration, and wherein the ventral fin projects below the chord plane from substantially at or near the midpoint of the curved transition section. In another exemplary embodiment, the ventral fin comprises an upper surface and a lower surface proximally bounded by a leading edge and distally bounded by a trailing edge, the leading and trailing edges being swept toward the airstream direction and converging at the ventral fin tip configuration.

BRIEF DESCRIPTION OF THE DRAWINGS

The drawings refer to embodiments of the present invention in which:

FIG. 5 is an enlarged trailing-edge view of an exemplary embodiment of a wing tip comprising a spanwise camber, according to embodiments described herein;

FIG. 6A is a perspective view a representative wing with a winglet end section according to embodiments described herein;

FIG. 6B is a trailing-edge view of the winglet of FIG. 6A, illustrated a spanwise camber of the winglet in accordance with aspects of the present invention;

FIG. 10 illustrates an exemplary load distribution along a wing which includes the exemplary embodiment of the split winglet illustrated in FIGS. 9A-9C;

Figure 1:
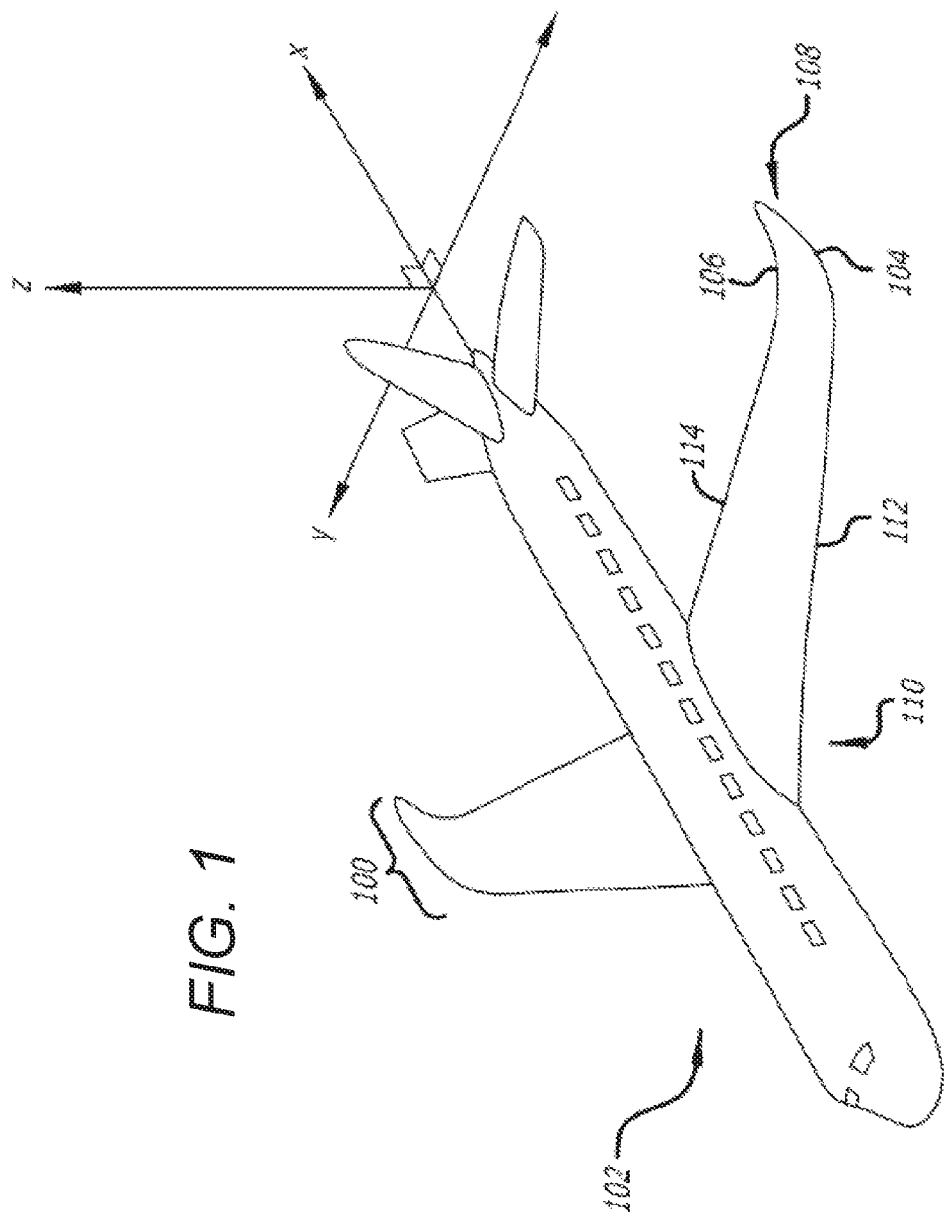
FIG. 1 is a perspective view of an exemplary airplane including wing tip geometry according to embodiments described herein.

While the present invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present invention.

DETAILED DESCRIPTION

In the following description, numerous specific details are set forth in order to provide a thorough understanding of the present invention. It will be apparent, however, to one of ordinary skill in the art that the present invention may be practiced without these specific details. In other instances, specific numeric references such as "first winglet," may be made. However, the specific numeric reference should not be interpreted as a literal sequential order but rather interpreted that the "first winglet" is different than a "second winglet." Thus, the specific details set forth are merely exemplary. The specific details may be varied from and still be contemplated to be within the spirit and scope of the present invention. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, an apparatus is provided for a split winglet configured for attachment to a wing tip of an airplane. The split winglet comprises an upper winglet smoothly extending from the wing tip above a chord plane of the wing and a ventral fin projecting below the chord plane from a lower surface of the upper winglet. Generally, the upper winglet further comprises a transition section which curves upward from the wing tip into a substantially planar section. In an embodiment, the ventral fin projects below the chord plane from substantially a midpoint of the transition section. The upper winglet comprises a transition section which curves upward from the wing tip into a substantially planar section. Upper and lower surfaces of the upper winglet are bounded by leading and trailing edges which are swept toward an airstream direction, parallel with the root chord, and curve toward the airstream direction before terminating at a point distal of the wing tip. In an embodiment, the leading and trailing edges of the upper winglet respectively are continuous extensions of a leading edge and a trailing edge of the wing. Similarly, upper and lower surfaces of the ventral fin are bounded by leading and trailing edges which curve toward the airstream direction and terminate at a point distal of the wing tip.

The following description should be read with reference to the drawings, in which like elements in different drawings are identically numbered. The drawings, which are not necessarily to scale, depict selected embodiments and are not intended to limit the scope of the invention. For instance, edges appearing be pointed in the drawings may in actuality be rounded (e.g., leading edges in FIG. 2B, FIG. 3, FIG. 4B, and FIG. 5). The description illustrates by way of example, not by way of limitation, the principles of the invention. This description will clearly enable one skilled in the art to make and use the invention, and describes several embodiments, adaptations, variations, alternatives, and uses of the invention, including what is presently believed to be the best mode of carrying out the invention.

Embodiments described herein include an optimum wing tip geometry for wings. The described geometry may reduce induced drag associated with premature tip vortex formation from suboptimum aerodynamic loading. Embodiments of the tip design geometry may preserve an elliptic load distribution to the tip of the wing. In addition, airfoil sections may be cambered and twisted so as to avoid flow separation along highly swept leading edges, thereby maintaining an elliptic loading to the extreme tip. Spanwise camber of lifting surfaces may also be incorporated to maintain flow attachment and avoid premature roll-up of tip vorticity.

Based on aerodynamic analysis of embodiments incorporating aspects of the present invention, it has been observed that significant reductions of induced drag can be expected relative to that found in typical current wingtip designs. These results may depend upon the proper selection of parameters that define the tip geometry and are discussed below. The potential benefits may be expected in the range of about −1% to about −3% induced drag reduction relative to a standard winglet for a commercial transport airplane configuration. The induced drag reduction may correspond to an increase in fuel efficiency in the range of about 0.7% to about 2% at normal cruising speeds. Additional benefits may be expected for low-speed operation.

Although embodiments of the invention are typically described in terms of wingtip devices, or winglets, the invention is not so limited. Aspects of the invention may be applied to lifting surfaces in general, and particularly to wings, and more particularly to aircraft, including planar wings without the use of winglets. Aeronautical propulsion systems, including, for example, propellers and helicopter rotors, may alternatively benefit equally from aspects of the invention and are additionally considered within the scope of the invention. Embodiments of the present invention may also apply to any applications which use either static or dynamic lifting surfaces such as helicopter rotors, ship propellers, and the like. Finally, other applications that may benefit from aspects of the invention include devices intended to move air or fluid, such as, by way of non-limiting example, fans.

Reference axes are used generally to orient the description, as known in the art, and therefore include a reference system for an exemplary airplane generally, a reference system for a wing of the airplane, and a reference system for a tip of the wing. As illustrated in FIG. 1, an airplane reference system is used to orient the description with respect to the aircraft. An x-axis runs along a longitudinal axis of the airplane from nose to the tail. A y-axis is perpendicular to the x-axis and is horizontally oriented relative to the airplane. Finally, a z-axis is orthogonal to both the x- and y-axes, oriented in the vertical direction. A wing reference system may also be used which generally differs from the airplane reference system, as it lies in the reference plane of the wing. Therefore, as illustrated in FIGS. 3 and 5, the wing reference system generally is rotated by an incidence angle, a dihedral angle, and a sweep angle. Finally, for embodiments described herein, as illustrated in FIGS. 2 and 4, an origin of a reference system for a wing tip geometry is coincident with the beginning of the wing tip geometry and lies generally in the plane of the wing, at the wing tip. However, this relationship may change substantially from the wing reference system in cases of winglet applications (e.g., as shown in FIG. 6). Generally, the wing tip reference system has its origin at the beginning of a curved leading edge of the wing tip, or a curved trailing edge, whichever is closer to the airplane. The x'-y' axis is then in the plane of the wing at the origin of the wing tip. Therefore, the wing tip geometry may be rotated from the airplane reference system by the sweep angle, the dihedral angle, an incidence angle, and a winglet angle, and displaced from the airplane reference system by the length of the wing to the wing tip.

FIG. 1 illustrates an exemplary airplane 102 including a wing tip section 100 according to embodiments described herein. The wing tip section 100 may be designed to minimize induced drag by preserving an elliptic load distribution. A leading edge 104 of the wing tip section 100 may be curved to avoid flow separation. A trailing edge 106 of the wing tip section 100 may be curved to maintain a desired chord variation. A trailing edge tip segment 108 may have a small, but finite dimension and sweep. The trailing edge tip segment 108 may be swept at an angle approximately the same or similar angle as a trailing edge sweep angle. The tip segment 108 may assist in stabilizing vorticity at the tip and maintain its position at the trailing edge.

A wing 110 has a leading edge 112 and a trailing edge 114. The leading edge 112 may be substantially straight, and may transition into the curved leading edge 104 of the wing tip section 100. The trailing edge 114 may be substantially straight before transitioning into the curved trailing edge 106 of the wing tip section 100. The leading edge 112 and the trailing edge 114 may also be swept. However, the leading edge 112 and the trailing edge 114 may be swept at different angles. For example, the leading edge 112 may comprise a greater sweep angle than a sweep angle of the trailing edge 114.

Figure 2A:
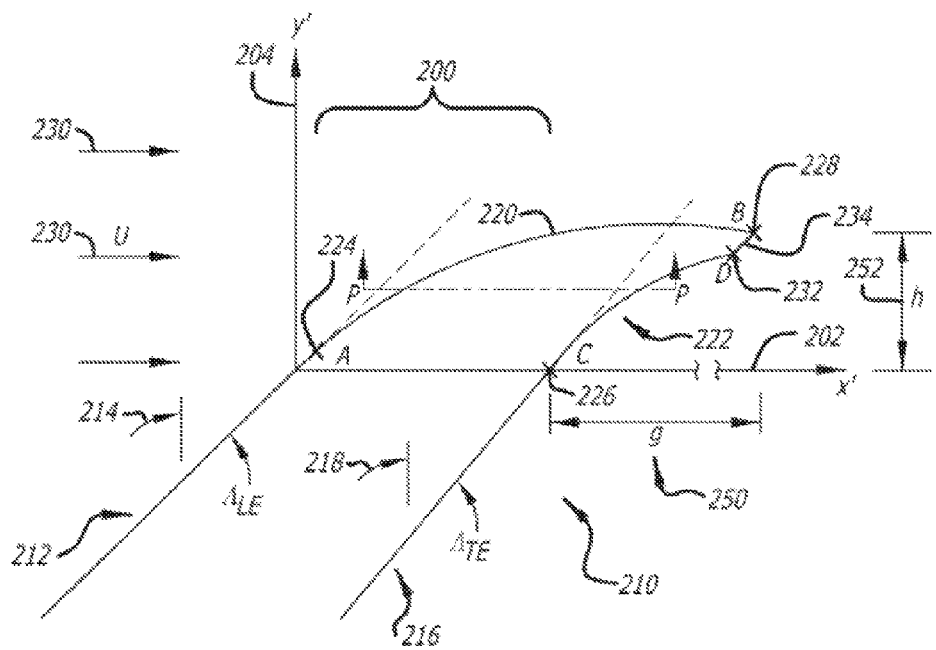
FIG. 2A is an enlarged top view of an exemplary embodiment of a wing tip according to aspects of the embodiments described herein.
Figure 3:
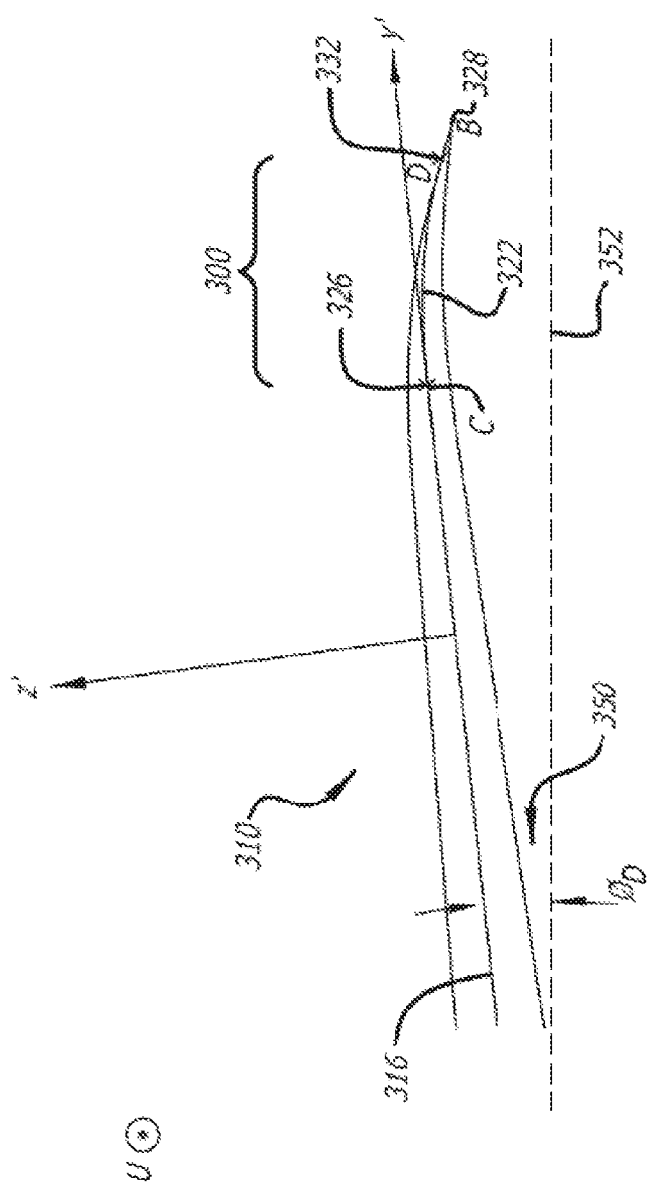
FIG. 3 is an enlarged trailing-edge view of an exemplary embodiment of a wing tip comprising a spanwise camber, according to embodiments described herein.

FIG. 2A is an enlarged top view of an exemplary embodiment of a wing tip geometry 200 according to aspects of the embodiments described herein. An x'-y' reference system for the wing tip geometry 200 may be created by a line parallel 202 and another line perpendicular 204 to the longitudinal axis of the airplane body. An x'-y' reference plane formed by the lines 202, 204 is within a plane of a wing 210. In some embodiments, the wing 210 is not perpendicular to the plane body, but is swept distally toward the rear of the airplane. The wing 210 may also be rotated upward at a dihedral angle, or tilted about a pitch axis of the airplane to create an incidence angle. In the illustrated embodiment of FIG. 2A, a leading edge 212 of the wing 210 is swept at an angle, $\Lambda_{LE}$, 214, relative to the y'-reference axis 204, and a trailing edge 216 is swept at an angle, $\Lambda_{TE}$, 218, relative to the y'-reference axis 204. The sweep angle of the leading edge 214 and the trailing edge 218 may be at the same angle or different angles. Preferably, the sweep angle of the leading edge 214 is greater than the sweep angle of the trailing edge 218.

In one embodiment, the tip of the wing 210 has a wing tip geometry 200 that curves distally toward the rear of the airplane. The wing tip geometry 200 begins along the leading edge at a point 224 and along the trailing edge at a point 226. The points 224, 226 do not necessarily have to be located at the same distance away from the body of the airplane. In some embodiments, for example, the point 224 may be located closer to the body of the airplane than point 226. A curved leading edge 220 and a curved trailing edge 222 begin tangentially with the leading edge 212 and the trailing edge 216, respectively, and then curve distally toward the rear of the airplane. The curved leading edge 220 and curved trailing edge 222 smoothly transition from the substantially straight leading and trailing edges 212, 216, respectively, then slope distally along a substantially parabolic curve approaching a free stream velocity direction U 230, and then terminate at an end segment 234 BD. As illustrated in FIG. 2A, the curved leading edge 220 terminates at a leading edge tip 228, and the curved trailing edge 222 terminates at a trailing edge tip 232. Preferably, the curved leading edge 220 is more closely aligned with the direction of the free stream velocity U 230 than is the curved trailing edge 222, such that the leading edge tip 228 is distal of the trailing edge tip 232.

In the illustrated embodiment of FIG. 2A, the end segment 234 BD, between the leading edge tip 228 and the trailing edge tip 232, is located distal of the curved trailing edge 222. In some embodiments, the end segment 234 BD may have a specified length and may be swept at an angle substantially equal to the angle, $\Lambda_{TE}$, 218 of the trailing edge 216. A reference length h 252 corresponds to a height of the leading edge tip 228 above the point 226 along the trailing edge of the wing 210, and thus may be used as a measure of the height of the end segment 234 BD above the point 226. A preferred ratio of the end segment 234 BD to the length h is in the range of 0.15<BD/h<0.20 with the ratio trending higher at higher values of tip lift coefficients. Observations indicate that the end segment 234 configured as in the illustrated embodiment advantageously stabilizes the tip vortex.

It will be recognized that the wing tip section 200 may be applied to a conventional flat wing, wherein the curved leading edge 220 and the curved trailing edge 222 lie in the wing reference plane (i.e., the x'-y' plane). In such an embodiment, the entire wing, emanating from the body of the airplane and terminating at the end segment 234, is positioned substantially in the same plane. In an alternate embodiment, the wing tip section 200 may be applied to a conventional winglet, wherein an end of the wing projects out of the x'-y' reference plane, in the z'-direction. Further, the wing tip section 200 may be integrally formed with the rest of the wing 210, or may comprise a separate assembly which is attached or adhered to the tip of the wing. The wing tip section 200 may be attached by way of bolting, welding, or any other known practice of attaching wing segments.

Figure 2B:
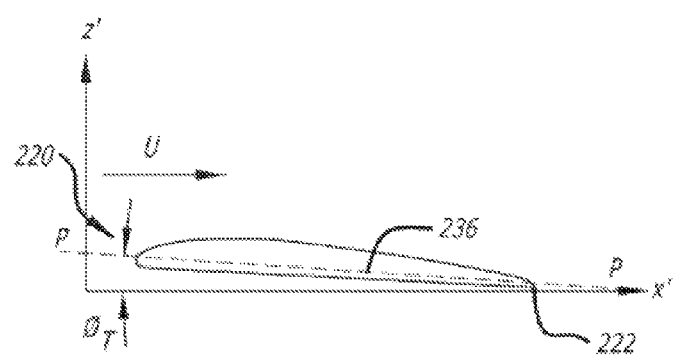
FIG. 2B is a cross-sectional view of the wing tip illustrated in FIG. 2A, taken along line P-P.

FIG. 2B is a cross-sectional view of the wing tip section 200, taken along line P-P of FIG. 2A. A chord, represented by dotted line 236, extends from the curved leading edge 220 to the curved trailing edge 222, and is oriented at an angle $\phi_T$ relative to the x'-reference line 202. The chord distribution conforms to the optimum aerodynamic loading on the wing surface. In one embodiment, the curved trailing edge 222 is designed to maintain a desired chord distribution to achieve elliptic loading. In other embodiments, airfoil sections may also be incorporated at specified locations, corresponding to the local chord line and the twist angle $\phi_T$ distribution.

These features may be alternatively described in mathematical terms, where all dimensions may be normalized relative to a tip extension length, g 250. The tip extension length g 250 is a straight-line distance of the trailing edge which extends past the trailing edge origin 226 of the wing tip geometry 200. As shown in FIG. 2A, the tip extension length 250 is the x'-direction distance between the origin 226 of the wing tip along the trailing edge 222 and the leading edge tip 228. As indicated above, the reference length h 252 corresponds to a height of the tip extension length, and thus is the y'-distance from the curved wing tip section 200 origin along the trailing edge, point 226, to the leading edge tip 228. Points A, B, C, D, and E are added for reference locations. Point A 224 is the point where the leading edge 212 transitions into the curved leading edge 220, and deviates from a line tangential with the leading edge 212. Reference point C 226 is the corresponding point along the trailing edge 216. Point B 228 is the end of the curved leading edge 220, while point D 232 is the end of the curved trailing edge 222. The segment BD is the end segment 234.

In some embodiments, the curved leading edge 220, from point A to B, may be defined by:

$$x-x_A=\tan \Lambda_{LE}(y-y_A)+M_1(y-y_A)^{m_1}+M_2(y-y_A)^{m_2}.$$

In one embodiment, the curved leading edge parameters $M_1$ and $m_1$, $M_2$ and $m_2$ are selected to define a planform that may maintain attached flow and avoid flow separation. The parameters are therefore chosen so as to create a smooth parabolic transition from the substantially straight leading edge 212 to a desired end slope at point B 228. A desired leading edge slope, dy/dx, at point B approaches the free stream direction U 230 and may be in the range of about 0.0 to about 0.1, and is preferably in the range about 0.03 to about 0.07. In one embodiment, the desired leading edge slope approaches about 0.05. To provide optimal performance characteristics, where $x_A$, $y_A$, g, and $\Lambda_{LE}$ are given, $M_1$ is in the range of about 0.4 to about 0.6, $M_2$ is in the range of about 0.08 to about 0.12, $m_1$ is in the range of about 3.6 to about 5.4, and $m_2$ is in the range of about 5.2 to about 7.7. Preferably, $M_1$ is about 0.5, $M_2$ is about 0.1, $m_1$ is about 4.5, and $m_2$ is about 6.5. The inclusion of two power terms is preferred to sufficiently provide control of the leading edge slope, dy/dx at point B and to match the optimum leading edge curve shape. The design includes at least one power term so as to create the smooth parabolic transition from the leading edge to the end point B 228. However, in other embodiments, power terms may be removed or added so as to further approach optimal performance.

The curved trailing edge 222, from point C to D, may be defined by:

$$x-x_C=\tan \Lambda_{TE}(y-y_C)+N_1(y-y_C)^{n_1}+N_2(y-y_C)^{n_2}.$$

In one embodiment, the curved trailing edge parameters $N_1$ and $n_1$, $N_2$ and $n_2$ are selected so as to maintain an appropriate chord variation and control of a trailing edge slope, dy/dx, approaching point D. The parameters are chosen to provide a smooth parabolic transition from the substantially straight trailing edge 216 to the curved trailing edge 222 so as to achieve elliptic loading over the wing tip section 200. The parameters may additionally be chosen so as to control an approach of the trailing edge slope at point D toward the free stream direction 230. For example, in some embodiments, the trailing edge slope at point D may fall within the range of about 0.0 to about 2.0. In one embodiment, the trailing edge slope approaching point D is in the range of about 0.06 to about 0.15, and is preferably about 0.10. To provide optimal performance characteristics, where $x_C$, $y_C$, segment BD, h, and $\Lambda_{TE}$ are given, $N_1$ is in the range of about 0.08 to about 0.12, $N_2$ is in the range of about 0.16 to about 0.24, $n_1$ is in the range of about 2.8 to about 4.2, and $n_2$ is in the range of about 3.6 to about 5.4. More particularly, $N_1$ is about 0.1, $N_2$ is about 0.2, $n_1$ is about 3.5, and $n_2$ is about 4.5. The inclusion of two power terms are preferred so as to sufficiently control the loading on the wing tip section 200 and maintain an appropriate chord variation. However, fewer or additional power terms may be removed or added to more particularly control these features. It will be appreciated that at least one power term should remain so as to achieve a parabolic transition from trailing edge to tip.

The end segment BD, may have a small but finite dimension and may be swept at an angle approximate to the trailing edge angle, $\Lambda_{TE}$, 218. This end segment BD may assist in stabilizing the tip vorticity and maintain the vortex position very close to the leading edge tip 228, at point B. It will be recognized that the length of segment BD may be determined by way of other parameters herein described above.

The airfoil sections may be cambered or twisted so as to maintain an elliptic loading of the wing tip section 200 and to avoid flow separation along the curved leading edge 220. The wing chord, represented by the dotted line 236, may be designed according to the parameters above to maintain the desired chord distribution. In some embodiments, the airfoil may additionally be twisted by an angle $\phi_T$, thereby angling the chord relative to the free stream direction 230. Airfoil twist may be defined by the rotation angle of the airfoil chord about the tip trailing edge, CDB, relative to the wing reference plane, x'-y' plane. In other embodiments, airfoil shapes may be modified variations of the winglet airfoil disclosed herein without deviating from the present invention.

FIG. 3 is an enlarged trailing-edge view of an exemplary embodiment of a wing tip section 300 of a wing 310 which comprises a spanwise camber, according to the present invention. The spanwise camber may be generated by a curve in the z'-direction, of a curved trailing edge 322 of the wing tip section 300 from the wing reference plane, x'-y'. In one embodiment, the curve in the z'-direction, lying in the y'-z' plane, begins tangentially from a wing trailing edge 316 at a point 326 and then deviates parabolically before terminating at a trailing edge end point 332. Therefore, in the illustrated embodiment, the end of the wing tip section 300 curves out of the x'-y' reference plane, thereby generating a wing tip surface which is substantially cylindrical until the trailing edge terminates at point 332. In another embodiment, the spanwise camber creates part of a cylindrical surface, which may be augmented by superposition of airfoil camber and twist.

The representative profile of a wing according to aspects of embodiments described herein, including a spanwise camber, may alternatively be described in mathematical terms. In some embodiments, the wing 310 may include a slight incline $\phi_D$, the dihedral angle 350, from horizontal 352, as the wing approaches the wing tip section 300. In some embodiments, the wing tip section 300 may also, or alternatively incorporate a spanwise camber so as to maintain flow attachment, reduce flow separation, and minimize premature roll-up along the outer edge of the wing tip section 300.

The camber may be defined in terms of vertical displacement, z, of the curved trailing edge CD from a straight line extension of the wing trailing edge 316, along the y'-axis, and may be defined by:

$$z-z_C = -P(y-y_C)^p, \text{ where } y_C < y < y_D.$$

In one embodiment, the parameters P and p, are selected in combination with the wing incline and twist so as to define the lifting surface between the previously defined curved leading and curved trailing edges. In an exemplary embodiment characterized by optimal performance, wherein $x_C$, $y_C$, segment BD, h, and $\Lambda_{TE}$ are given, P is in the range of about 0.12 to about 0.18, and p is in the range of about 2.0 to about 3.0. Preferably, P is about 0.15, and p is about 2.5. In other embodiments, the wing tip section 300 may be curved in the opposite direction, or in the positive z-direction, according to the same principles described herein. Moreover, in some embodiment, the above combination of parameters may be defined in relation to a wing planform (i.e., sweep and taper) and aerodynamic loading so as to maintain the elliptic loading and attached flow to the wing tip section 300. It will be appreciated that the above-discussed design parameters may be specified within appropriate limits to provide optimal performance characteristics.

Figure 4A:
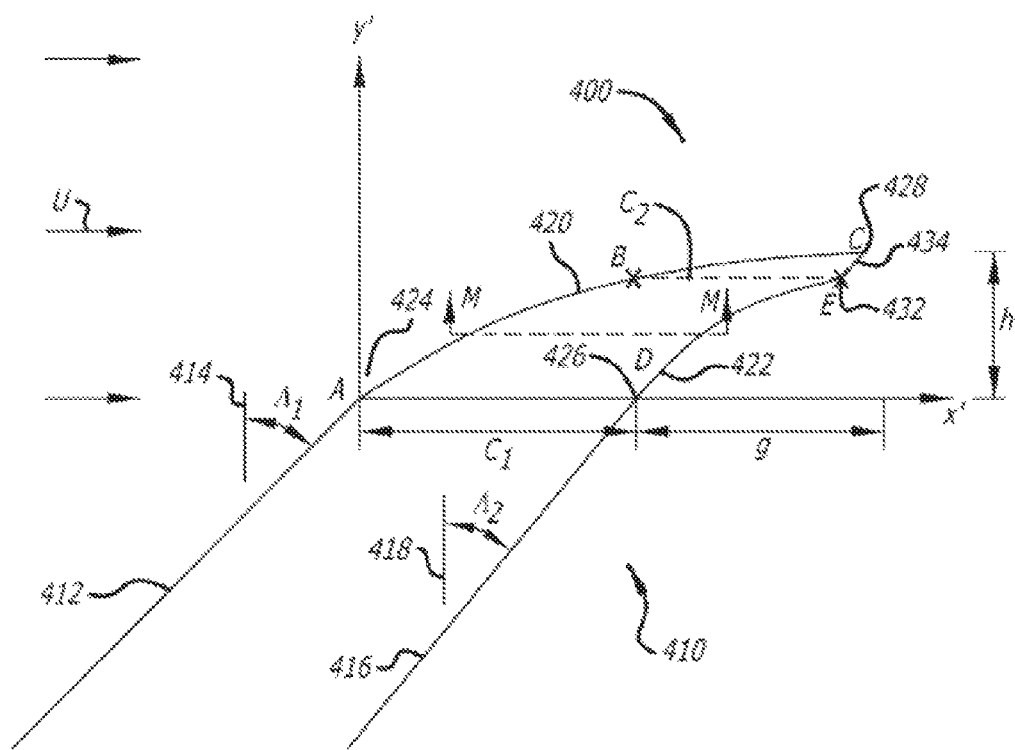
FIG. 4A is an enlarged top view of an exemplary embodiment of a wing tip according to aspects of the embodiments described herein.

FIG. 4A is an enlarged top view of an exemplary embodiment of a wing tip section 400 of a wing 410 according to aspects of the embodiments described herein. The wing 410 includes a substantially straight leading edge 412, swept rearward at an angle $\Lambda_1$ 414 and a trailing edge 416, which is also substantially straight and swept rearward at an angle $\Lambda_2$ 418. In one embodiment, the wing tip section 400 begins at point 424 along the leading edge 412, and a point 426 along the trailing edge 416. The points 424 and 426 may be located at the same distance away from the airplane body, as in the illustrated embodiment, or may be located at different distances from the airplane body. For example, in an embodiment, the point 424 may be located as shown, but the point 426 along the trailing edge 416 may be located further away from the airplane body. In the illustrated embodiment, the wing tip section 400 includes a curved leading edge 420 and a curved trailing edge 422. The curved leading edge 420 emanates from a line tangential with the leading edge 412 and smoothly transitions along an elliptical curve to an endpoint 428. A slope of the curved leading edge 420 nearing the point 428 approaches the free stream direction U. Similarly, the curved trailing edge 422 emanates tangentially from the trailing edge 416 and curves rearward along an elliptical curve to an endpoint 432, where a slope of the curved tailing edge 422 nearing the end point 432 also approaches the free stream direction U. As will be appreciated, the slope approaching the wing tip is not necessarily the same along the curved leading edge 420 and the curved trailing edge 422.

In one embodiment, an end segment 434, between the leading edge tip 428 and the trailing edge tip 432, may be located distally of the curved trailing edge 422. In some embodiments, the segment 434 may have a specified length and may be swept at an angle substantially equal to the wing trailing edge sweep angle 418. Preferably, the end segment 434 has a length in a range of 0.15<CE/h<0.20, wherein the ratio trends higher at higher values of tip lift coefficients. Observations indicate that an end segment such as CE 434 advantageously stabilizes the tip vortex.

The embodiment illustrated in FIG. 4A may also be described in mathematical terms so as to define an optimal design which maintains an attached flow and avoids premature vortex roll-up. Points A, B, C, D, and E along with lengths $C_1$, $C_2$, g, and h are included for reference. As described above, point A 424 and point D 426 are the respective origins of the curved end section 400 along the leading edge 412 and the trailing edge 416. Points C 428 and E 432 are the respective end tip locations of the curved leading edge 420 and the curved trailing edge 422, respectively. Point B is a location along the curved leading edge 420 corresponding to the same y'-distance as point E of the curved trailing edge 422. Reference length $C_1$ is the distance along the x'-direction between reference points A and D, while reference length $C_2$ is the distance along the x'-direction between points B and E. Reference height h is the y'-direction distance from the origin along the trailing edge, point D, to the curved wing tip extreme end, point C. Reference distance g is the x'-direction distance from point D to the curved leading edge end point C.

The leading curved edge 420, from point A to C, may be defined by:

$$x-x_A = [y-y_A] \tan \Lambda_1 + a_1[(1-((y-y_A)/b_1)^{n_1})^{(1/m_1)} - 1].$$

In one embodiment, the curved leading edge geometry parameters $a_1$, $b_1$, $m_1$, and $n_1$ are selected so as to define a planform which maintains an attached flow and reduce flow separation, while minimizing premature vortex roll up. As will be recognized, the inclusion of these four parameters is sufficient to provide control of the leading edge curvature near point A, and the contour slope at point C, so as to define an optimal leading edge contour. In other embodiments, additional terms may be added or removed so as to further refine the optimum parameters.

Sizing parameters $(g/C_1)$, $(h/C_1)$, $(dy/dx)_C$, and $(C_2/C_1)$ relate to overall planform proportions and provide a framework for optimizing contours for both leading edge 420 and the trailing edge 422. In an exemplary embodiment characterized by acceptable performance levels, $(g/C_1)$ is in the range of about 0.50 to about 0.80, $(h/C_1)$ is in the range of about 0.60 to about 1.00, $(dy/dx)_C$ is in the range of about 0.03 to about 0.07, and $(C_2/C_1)$ is in the range of about 0.60 to about 0.70. In one embodiment, $(g/C_1)$ is about 0.60, $(h/C_1)$ is about 0.70, $(dy/dx)_C$ is about 0.05, and $(C_2/C_1)$ is about 0.65.

Leading edge contour parameters $(a_1/C_1)$, $(b_1/C_1)$, $m_1$, and $n_1$ define the leading edge contour within the sizing framework. In an exemplary embodiment characterized by acceptable performance levels, $(a_1/C_1)$ is in the range of about 1.50 to about 2.50, $(b_1/C_1)$ is in the range of about 0.60 to about 0.90, $m_1$ is in the range of about 2.0 to about 4.0, and $n_1$ is in the range of about 1.50 to about 3.0. In one embodiment, $(a_1/C_1)$ is about 2.0, $(b_1/C_1)$ is about 0.70, $m_1$ is about 3.0, and $n_1$ is about 2.0.

The curved trailing edge 422, from point D to E, may be defined by:

$$x-x_D = y \tan \Lambda_2 + a_2[(1-((y-y_D)/b_2)^{n_2})^{(1/m_2)} - 1].$$

In an embodiment, the trailing edge curvature near point D and the contour slope near point E are defined so as to achieve a chord distribution consistent with an elliptical loading over the planform to minimize drag, thereby providing optimal performance characteristics.

Sizing parameters $(g/C_1)$, $(h/C_1)$, $(dy/dx)_E$, and $(C_2/C_1)$ relate to overall planform proportions and provide a framework for optimizing contours for both the leading edge 420 and the trailing edge 422. These sizing parameters, with the exception of $(dy/dx)_E$, have been previously selected, as discussed above in terms of the curved leading edge geometry. Sizing parameter $(dy/dx)_E$ is acceptable within the range of about 0.06 to about 0.15, and is preferably about 0.10. Therefore, contour parameters, $(a_2/C_1)$, $(b_2/C_1)$, $m_2$, and $n_2$ remain to be selected. The trailing edge contour parameters $(a_2/C_1)$, $(b_2/C_1)$, $m_2$, and $n_2$ define the trailing edge contour within the sizing framework. In an exemplary embodiment characterized by acceptable performance levels, $(a_2/C_1)$ is in the range of about 0.80 to about 1.50, $(b_2/C_1)$ is in the range of about 0.30 to about 0.60, $m_2$ is in the range of about 1.50 to about 2.50, and $n_2$ is in the range of about 1.50 to about 2.50. In one embodiment, $(a_2/C_1)$ is about 1.0, $(b_2/C_1)$ is about 0.40, $m_2$ is about 2.0, and $n_2$ is about 2.0.

In one embodiment, the end segment 434, segment CE, comprises a small but finite dimension and may be swept at the trailing edge angle $\Lambda_2$. The end segment 434 may assist in stabilizing the tip vorticity and maintain the vortex position close to the extreme tip, point E. As will be recognized by those skilled in the art, the length of segment CE is determined by the sizing and contour parameters described above.

Figure 4B:
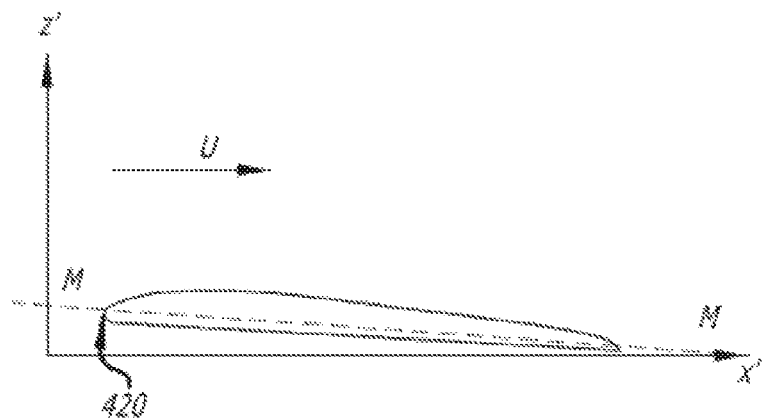
FIG. 4B is a cross-sectional view of the wing tip illustrated in FIG. 4A, taken along line M-M.

FIG. 4B is a cross-sectional view of an airfoil section of the wing tip 400 illustrated in FIG. 4A, taken along line M-M. The airfoil section may be cambered and twisted to maintain an elliptic loading to the extreme tip and avoid flow separation along the highly swept curved leading edge 420. Airfoil twist may be defined by a rotation angle of the airfoil chord about the tip trailing edge, CED, relative to the wing reference plane, x'-y'. In other embodiments, airfoil shapes may be modified variations of the winglet airfoil disclosed herein without deviating from the present invention.

FIG. 5 is an enlarged trailing-edge view of an exemplary embodiment of a curved tip section 500 of a wing 510 comprising a spanwise camber, according to embodiments described herein. In some embodiments, the wing 510 may include a slight incline, a dihedral angle, $\phi_D$, 550, from horizontal 552, as the wing approaches the curved tip section 500. In some embodiments, the geometry of the curved tip section 500 may also, or alternatively, incorporate a spanwise camber of the wing lifting surface to maintain flow attachment, reduce flow separation, and minimize premature roll-up along the outer edge of the curved tip section 500.

The camber may be defined in terms of a lateral displacement, z, of a curved trailing edge 522, CD, from a straight line extension of a wing trailing edge 516, and may be defined by:

$$z/C_1 = -P([y-y_D]/h - 1)^p.$$

where $C_1$ is the length between point A 424 and point D 426, discussed above in connection with FIG. 4A. In one embodiment, the parameters P and p are selected in combination with the airfoil camber and twist and define the lifting surface between the previously defined curved leading and curved trailing edges. In an exemplary embodiment characterized by optimal performance characteristics, wherein the sizing parameters are given as described above, P is in the range of about 0.10 to about 0.25, and p is in the range of about 2.0 to about 4.0. More particularly, P is about 0.15, and p is about 2.5. In other embodiments, the spanwise camber may alternatively curve in the opposite, or positive z, direction. The above combination of parameters may be defined in relation to the wing planform (i.e. sweep and taper) and aerodynamic loading so as to maintain elliptic loading and attached flow to curved tip section 500. It will be appreciated that the design parameters may be specified within appropriate limits so as to provide optimal performance characteristics.

FIG. 6A illustrates a perspective view a representative wing 610 with a wing end section 600 according to embodiments described herein as applied to a winglet 660. The end of the wing may be turned upward in a winglet form 660, as illustrated more fully in FIG. 6B. In some embodiments, the winglet 660 may be attached to the end of the wing 610 and may be comprised of any conventional design. For example, in the illustrated embodiment, the winglet 660 comprises a transition section 662 out of the plane of the wing 610 into a vertical direction. The transition section 662 may be a continuous transition, as shown, such as along a constant radius, parabolic, or an elliptical curve. In some embodiments, the transition section 662 may comprise a non-continuous section. In the embodiment illustrated in FIGS. 6A-6B, the end of the winglet 660, after the transition section 662, is substantially planar. Further, the wing 610 may be at an angle $\phi_D$ 650 from the horizontal 652. A leading edge 612 and a trailing edge 616 are substantially straight within the plane of the wing 610 and through the transition section 662 until transitioning into the wing tip section 600. In the illustrated embodiment, the leading edge 612 and trailing edge 616 merely transition into a vertical direction, thereby forming the winglet 660.

As in the embodiment illustrated in FIG. 6A, the winglet 660 may include a curved leading edge 620, a curved trailing edge 622, and an end segment 634. The curved leading edge 620 generally deviates from the upward turned tangential of the leading edge 612, while the curved trailing edge 622 deviates from the upward turned tangential of the trailing edge 616. The curved leading edge 620 and the curved trailing edge 622 may be parabolic or elliptic. As will be appreciated, the end segment 634 may be advantageously configured according to the embodiments described herein. Further, the winglet 660 may incorporate aspects of the spanwise camber, as illustrated in FIG. 6B. In the illustrated embodiment, the curved wing tip section 600 comprises only a portion of the winglet 660, and preferably is located at the end of the winglet following the transition section 662.

Figure 7:
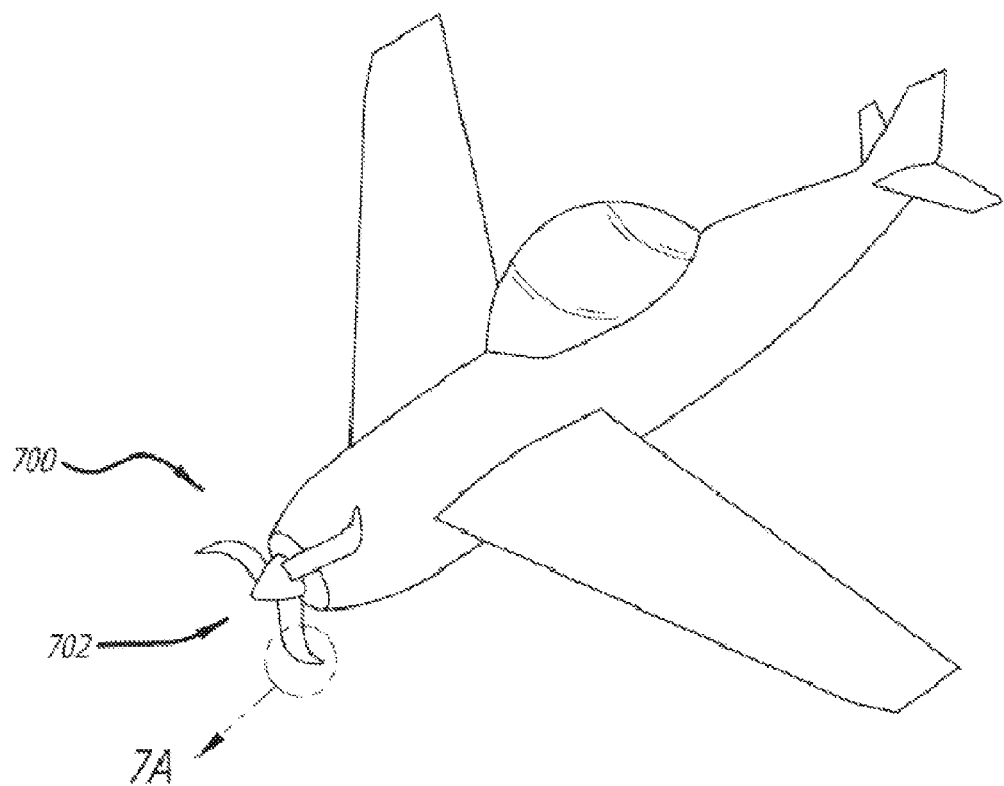
FIG. 7 illustrates a perspective view of an airplane comprising an exemplary embodiment of a propeller, in accordance with the present invention.
Figure 7A:
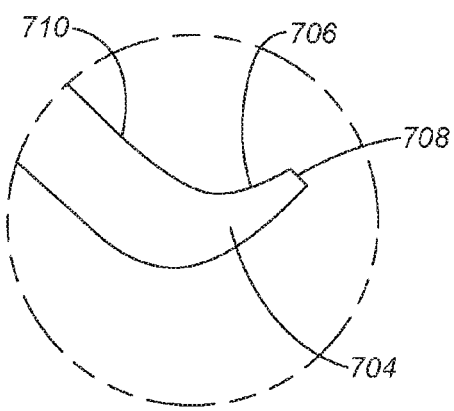
FIG. 7A is an enlarged section view of a propeller tip geometry of the exemplary propeller illustrated in FIG. 7.

FIG. 7 illustrates a perspective view of an airplane 700 comprising an exemplary embodiment of a propeller 702, in accordance with the present invention. As illustrated in FIG. 7A, the propeller tip geometry comprises a curved leading edge 704, a curved trailing edge 706, and an end segment 708. The curved edges 704, 706 transition smoothly from a propeller blade body 710. In some embodiments, the curved leading edge 704 may be designed according to embodiments described herein. The curved leading edge 704 may be parabolic or elliptic, and may be configured to maintain attached air flow and reduce flow separation. Further, the curved trailing edge 706 may also be configured according to embodiments described herein, and may follow a parabolic or elliptic contour so as to maintain an appropriate chord variation and control the trailing edge slope at the tip of the propeller 702. As illustrated in FIGS. 7-7A, the end segment 708 connects the end of the curved leading edge 704 and the end of the curved trailing edge 706. The end segment 708 generally comprises a finite dimension and is angled so as to stabilize tip vorticity and to maintain the trailing vortex position at the tip of the propeller 702. It will be appreciated that the design parameters for the propeller 702 are substantially the same as for the various embodiments discussed above. Moreover, in other embodiments, the various embodiments described herein may be applied to duel propeller aircraft, wherein the propellers may be attached to the aircraft wings.

Figure 8:
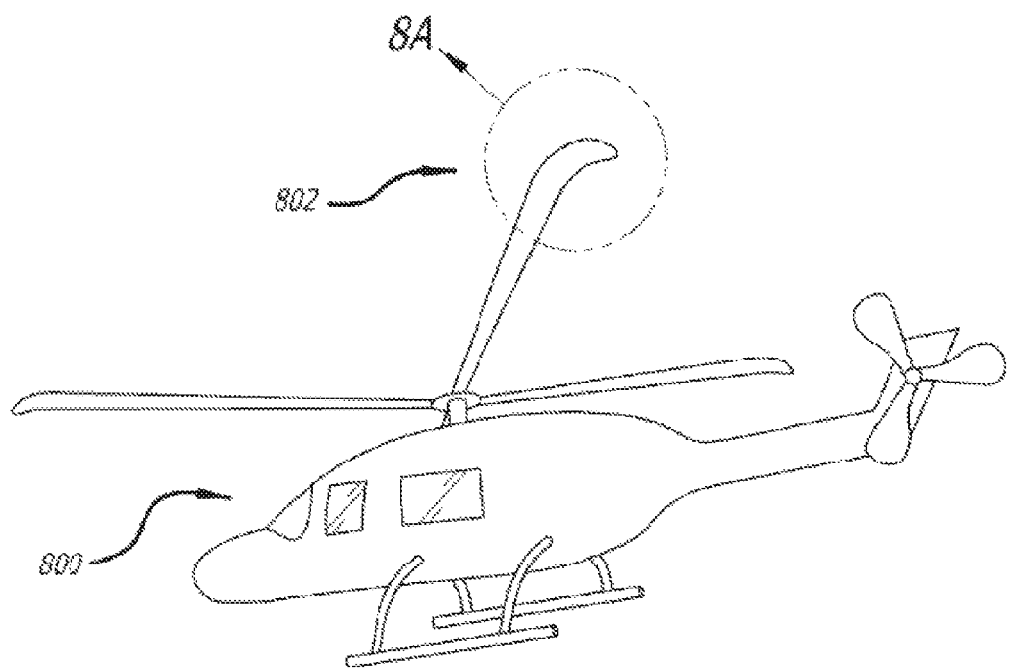
FIG. 8 illustrates a perspective view of a helicopter comprising an exemplary embodiment of a rotor according to the present invention.
Figure 8A:
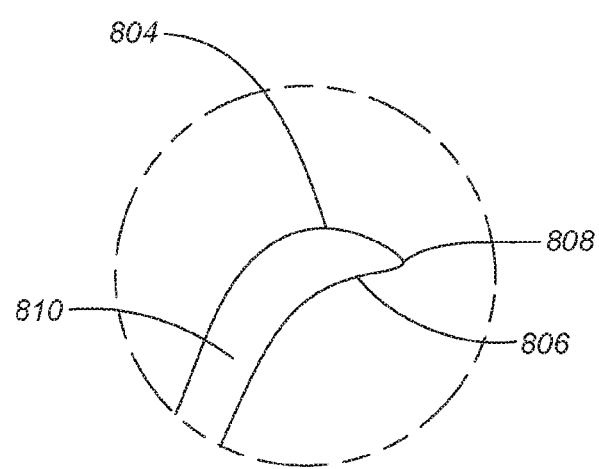
FIG. 8A is an enlarged section view of a rotor tip geometry of the exemplary rotor illustrated in FIG. 8.

FIG. 8 illustrates a perspective view of a helicopter 800 comprising an exemplary embodiment of a rotor 802 according to the present invention. As illustrated in FIG. 8A, the rotor tip geometry comprises a curved leading edge 804, a curved trailing edge 806, and an end segment 808. The curved edges 804, 806 transition smoothly from a rotor blade body 810. In some embodiments, the curved leading edge 804 may be parabolic or elliptic, and id configured according to aspects of the above described embodiments so as to maintain attached air flow and reduce flow separation. Further, the curved trailing edge 806 may also be parabolic or elliptic, but may be designed with different parameters according to aspects of the present invention so as to maintain an appropriate chord variation and to control trailing edge slope at the tip of the rotor 802. The end segment 808 generally connects the end of the curved leading edge 804 and the end of the curved trailing edge 806, as illustrated in FIG. 8A. Generally, the end segment 808 comprises a finite dimension and is angled so as to stabilize tip vorticity and to maintain the trailing vortex position at the tip of the rotor 802. It will be appreciated that the design parameters for the rotor 802 are substantially the same as for the various embodiments discussed above.

In some embodiments, a blended, or split, winglet may be used to produce superior drag reduction and improvements in other aspects of airplane performance, as will be recognized by those skilled in the art. Further, embodiments of the split winglet, described herein, provide additional performance benefits with essentially no change in the structural support needed beyond that required by the basic blended winglet design. Generally, the embodiments of the split winglet described below involve incorporating an additional surface, or ventral fin, below the wing chord plane. In one embodiment, the ventral fin is integrally configured with the curved winglet. In another embodiment, the ventral fin is an add-on to an existing winglet.

Figure 9A:
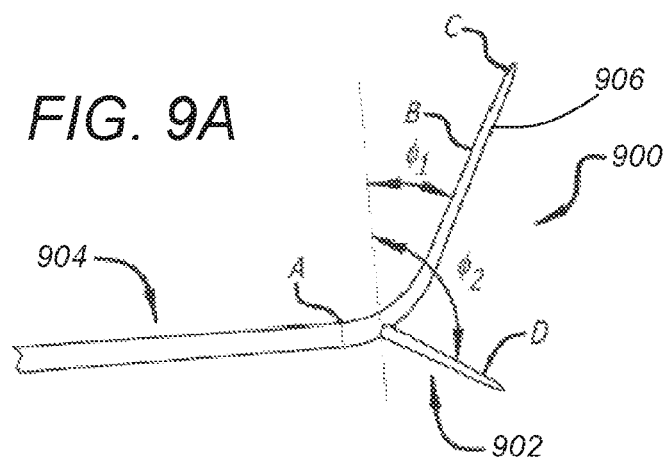
FIG. 9A is a front profile view of an exemplary embodiment of a split winglet in accordance with the present invention.
Figure 9B:
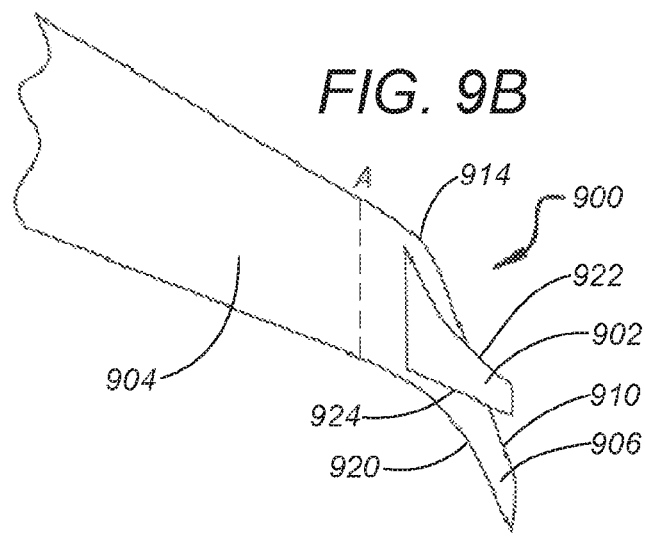
FIG. 9B is a bottom view of the embodiment of the split winglet illustrated in FIG. 9A.
Figure 9C:
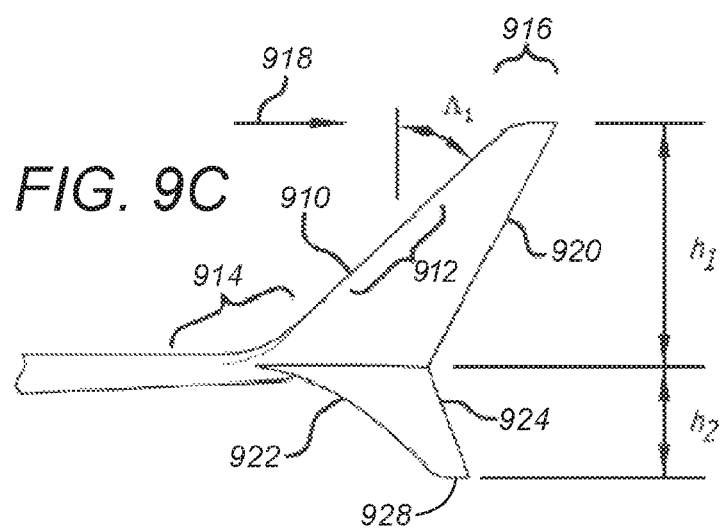
FIG. 9C is a side view of the embodiment of the split winglet illustrated in FIGS. 9A-9B.

FIGS. 9A-9C illustrate an exemplary embodiment of a split winglet 900. FIG. 9A is a front view of the split winglet 900 comprising a ventral fin 902 and an upper winglet 906. FIG. 9B illustrates a bottom view of the split winglet 900 and a lower surface of the ventral fin 902 of FIG. 9A. FIG. 9C illustrates a side view of the split winglet 900 and an upper surface of the ventral fin 902. In the embodiment illustrated in FIGS. 9A-9C, the split winglet 900 comprises a primary surface attached to the wing 904 at A and further comprises a near-planar outer panel B, a tip configuration C, and a transition section A-B between the wing 904 and the outer panel of the winglet 900. The ventral fin 902 projects below a chord plane of the wing 904 and comprises a ventral surface D.

In an exemplary embodiment, parameters affecting the geometry of the split winglet 900 may be varied within typical ranges (i.e., size ($h_1$), cant ($\phi_1$), sweep ($\Lambda_1$), camber ($\varepsilon$), and twist ($\theta$)) without significantly compromising optimization of the ventral surface D or overall performance of the split winglet 900. The tip configuration, C, and the geometry of each surface may be individually designed so as to provide an elliptical tip loading corresponding to a loading of each surface of the split winglet 900.

The outer panel B is designed to carry most of the load during operation of the split winglet 900. In embodiment illustrated in FIG. 9A, the outer panel B is substantially planar, and projects upward from the tip of the wing 904 at a cant angle $\phi_1$. A leading edge 910 of the outer panel B is swept rearward at an angle $\Lambda_1$. The outer panel B extends to a height $h_1$ above the plane of the wing 904. The transition section A-B between the wing 904 and the outer panel B is configured to minimize aerodynamic interference. In an exemplary embodiment, the transition section A-B comprises a near-radial curve having a curvature radius of r. In a further exemplary embodiment, the tip configuration C is optimized to provide an elliptical loading tip loading, as mentioned above.

The ventral surface D is sized and oriented to conform to certain physical constraints and optimized to provide a loading corresponding to maximum benefit with minimal effect on the wing bending moment. As illustrated in FIGS. 9A and 9C, the ventral fin 902 projects from the transition section A-B of the split winglet 900 with a cant angle $\phi_2$ and extends below the plane of the wing 904 by a distance $h_2$.

During operation of the split winglet 900, drag is advantageously reduced as compared with a blended winglet comprising the same size primary surface as the primary surface B. In some embodiments, wherein the ventral surface D comprises a height which is about 0.4 the height of the primary surface B (i.e., $h_2=0.4 \times h_1$), drag may be reduced by substantially 2% or more. Other aerodynamic characteristics are similarly enhanced, thereby resulting in higher cruise altitudes, shorter time-to-climb, improved buffet margins, reduced noise, and higher second segment weight limits without any adverse effects on airplane controllability or handling qualities.

As will be recognized by those skilled in the art, any improvement in structural stiffness characteristics of the wing 904 generally produces additional drag benefits corresponding to a reduction in wing aeroelastic twist. Thus, the drag benefit may be increased if the wing 904 has available structural margin or the wing 904 can be structurally modified to allow increased bending moment. As will be appreciated, a tradeoff between wing modification and drag reduction can be favorable for modest increases in bending moment beyond that produced by the winglet alone.

In some embodiments, the ventral fin 902 may be configured to emanate from the plane of the wing 904 at generally the same spanwise wing location as the upper winglet 906. In other embodiments, the ventral fin 902 may be configured to emanate from other locations along the winglet 900, including along the transition section A-B or the lower facing surface of the outer panel B. In an exemplary embodiment, the ventral fin 902 may be configured to emanate from a general midpoint of the transition section A-B.

In some embodiments, the upper winglet 906 may continuously transition from the wing 904. In an exemplary embodiment, illustrated in FIG. 9C, the upper winglet 906 comprises a transition section 914 which smoothly extends from the upper and lower surfaces of the wing 904 along leading and trailing edges of the wing 904, such that the upper winglet 906 smoothly integrates with the surfaces and edges of the wing 904. The transition section 914 of the upper winglet 906 continuously and smoothly curves toward the vertical so as to seamlessly transition from a profile of the wing 904 to a generally planar profile of the upper winglet 906, as illustrated in FIG. 9A. The upper winglet 906 extends in a plane from the transition section 914 at an angle $\phi_1$ with respect to vertical and terminates at a winglet tip configuration 916. As best illustrated in FIG. 9C, the leading edge 910 comprises a generally linear section 912 swept at an angle $\Lambda_1$. As illustrated in FIG. 9C, the leading edge 910 continuously and smoothly transitions from the leading edge of the wing 904, along the transition section 914, to the generally linear section 912. At an upper end of the linear section 912, the leading edge 910 continues along a curved path into the winglet tip configuration 916, such that the leading edge 910 curves toward an airstream direction 918, which generally is parallel to the body of the airplane 102, as illustrated in FIG. 1. As illustrated in FIGS. 9B-9C, the trailing edge 920 is generally linear and transitions along a curved and upward path, such that the trailing edge 920 continuously transitions from the trailing edge of the wing 904 to the winglet tip configuration 916. In other embodiments, however, the upper winglet 906 may be swept and tapered to a greater extent than the wing 904.

As illustrated in FIGS. 9A-9C, the ventral fin 902 generally comprises a planar projection below the upper winglet 906 which extends below the plane of the wing 904 at an angle $\phi_2$ with respect to vertical. As best illustrated in FIG. 9C, the ventral fin 902 is generally wing-shaped, such that the ventral fin 902 is swept and tapered. The ventral fin 902 further comprises a leading edge 922 which extends generally linearly from the upper winglet 906, then extends along a continuous curve toward the airstream direction 918, and then terminates at a ventral fin tip 928. In other embodiments, the leading edge 922 may be curved so as to reduce any discontinuity between the surfaces of the wing 904 and the ventral fin 902. Thus, in some embodiments the leading edge 922 may be positioned closer to the leading edge 910 of the upper winglet 906, then extend away from the upper winglet 906, and then terminate at the ventral fin tip 928.

In the illustrated embodiment of FIGS. 9B-9C, a trailing edge 924 of the ventral fin 902 is generally linear, extending directly from the upper winglet 906 and terminating at the ventral fin tip 928. In some embodiments, however, the trailing edge 924 may be curved, as discussed above in connection with the leading edge 922. It will be recognized that configuring the trailing edge 924 as a curve serves to reduce any discontinuity between the trailing edge 920 of the upper winglet 906 and the trailing edge 924 of the ventral fin 902. Further, the chord length of the ventral fin 902 at an attachment location with the upper winglet 906 may be equal to or less than the chord length of the upper winglet 906 at the attachment location. As illustrated in FIGS. 9B-9C, the chord length of the ventral fin 902 is less than the chord length of the upper winglet 906 at the attachment location. The trailing edge 924 of the ventral fin 902 emanates from a point along the trailing edge 920 of the upper winglet 906, whereas the leading edge 922 of the ventral fin 902 emanates from a bottom surface of the upper winglet 906.

In an exemplary embodiment, the split winglet 900 is integrated such that the upper winglet 906 and ventral fin 902 comprise a continuous wing tip structure. The upper winglet 906 therefore comprises an upward projecting surface and the ventral fin 902 comprises a lower projecting surface. In some embodiments, the ventral fin 902 may project from a lower surface of the upper winglet 906 at a near linear profile, as illustrated in FIG. 9A. The intersection of the upper winglet 906 and the ventral fin 902 may be continuous so as to constitute a blended intersection, thereby minimizing aerodynamic interference and producing optimal loading. In other embodiments, the upper winglet 906 and the ventral fin 902 may emanate from the same spanwise location of the wing 904.

In some embodiments, the ventral fin 902 may comprise a component separate from the upper winglet 906 and be attached to either the wing 904 or the upper winglet 906. The ventral fin 902 may be bolted or otherwise fastened to the tip of the wing 904. Further, the ventral fin 902 may comprise a ventral surface D which is generally linear. In some embodiments, the ventral fin 902 may be attached to the upper winglet 906 near a mid-point of the transition section A-B, such that the ventral fin 902 extends below the wing 904.

FIG. 10 illustrates an exemplary load distribution 1000 for a wing 1004 which includes a split winglet 1006, in accordance with the geometries and design considerations described above in connection with FIGS. 9A-9C. The split winglet 1006 comprises an upper winglet 1008 and a lower ventral fin 1010. It will be recognized that the split winglet 1006 is substantially similar to the split winglet 900, and thus the upper winglet 1008 comprises a primary surface B, and the lower ventral fin 1010 comprises a ventral surface D.

As illustrated in FIG. 10, the load distribution 1000 is optimized with a loading of the primary surface B being directed inboard and a loading of the ventral surface D being directed outboard. It should be recognized that the load distribution 1000 provides a substantially maximum drag benefit for any combination of primary and ventral surface sizing for which the loads do not exceed the structural capability of the wing 1004. The load of the primary surface B and the load of the ventral surface D are generally elliptical. As indicated in FIG. 10, the loading at the end of the primary surface B and ventral surface D is greatest at the origin of each surface, indicated respectively as $I_{1B}$ and $I_{1D}$, and approaches zero at the tip of each surface. The load of each surface at the tip of the wing 1004, indicated as $I_1$, is generally equal to the sum of the loading at the origin of the primary surface B and the ventral surface D, (i.e., $I_{1B}+I_{1D}$).

Figure 11B:
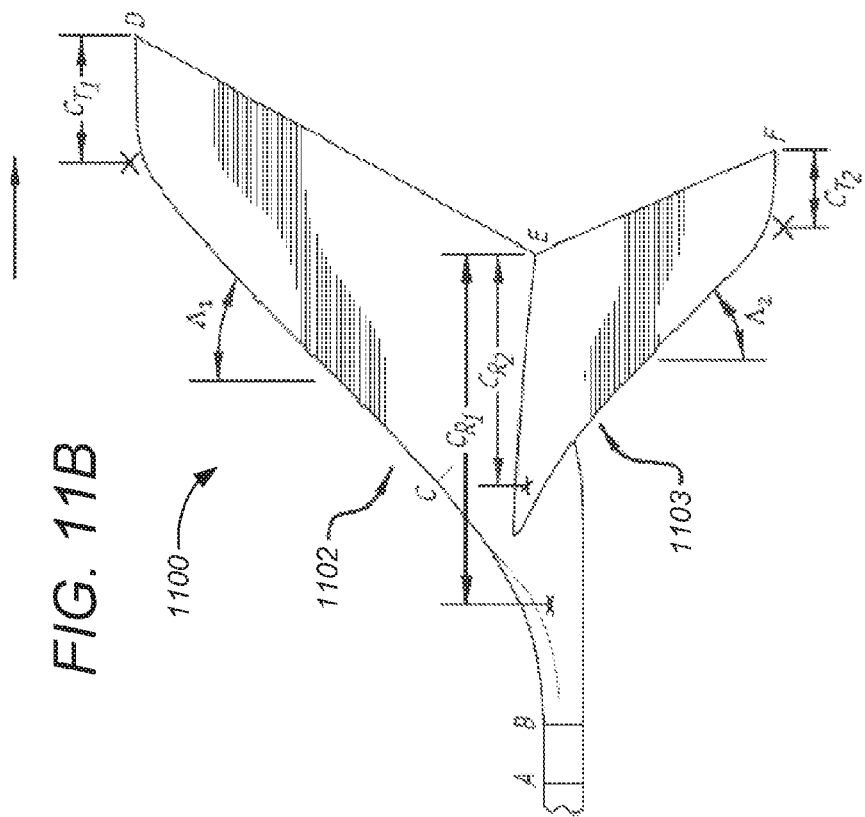
FIG. 11B is a side view of the embodiment of the integrated split winglet illustrated in FIG. 11A.
Figure 11A:
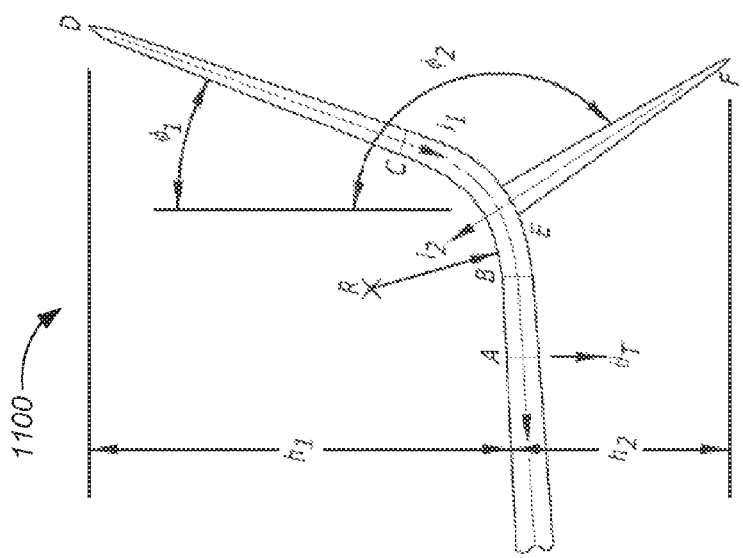
FIG. 11A is a front profile view of an exemplary embodiment of an integrated split winglet in accordance with the present invention.

FIGS. 11A-11B illustrate an exemplary embodiment of an integrated split winglet 1100, according to the present invention. FIG. 11A illustrates an exemplary front view of the winglet 1100, while FIG. 11B illustrates an exemplary side view. The exemplary integrated split winglet 1100 is conceived as a unit that may be attached directly to the wing tip at location A. However, it will be apparent to those skilled in the art that the integrated split winglet is easily separable into two or more parts, including a first, upper element 1102 which closely resembles a blended winglet and a second, lower element 1103, the ventral fin, which is attachable to the upper element 1102 at a transition between the wing tip and the winglet upper element 1102 (i.e. transition section BC).

The upper element 1102 generally comprises an adapter section (AB), a transition section (BC), and a blade section (CD). The adapter section AB is configured to fit the split winglet onto an existing wing end, and generally corresponds to the wing surface extending from A. As viewed from above, the adapter section AB generally is trapezoidal. The transition section BC provides a continuous transition surface between the extended wing surface at B and the blade section at C. In the illustrated embodiment of FIG. 11A, the transition section BC has a radius of curvature R. In some embodiments, the curvature of the transition section BC may be variable. The blade section CD is generally planar and is designed to carry most of the load. The different sections of the upper element 1102 are serially connected, such that the upper element 1102 comprises continuous leading edge and trailing edge curves which bound upper and lower surfaces of the upper element 1102 so as to form a solid body having an airfoil cross section.

As mentioned above, in some embodiments the transition section BC may have a variable radius along its length. Thus, the transition section BC may be described in terms of an average radius, $R_A$, and a minimum radius, $R_M$, at any point along the transition. The transition section BC of the upper element 1102 may comprise an average radius of curvature, $R_A$, of the principle spanwise generator and a minimum radius of curvature at any point, $R_M$, which meets the criteria:

$$\frac{R_A}{h} = K_A\left(\frac{1}{\sqrt{1+\sin\phi_1}}\right),$$

where, $K_A$ is preferably between 0.25 and 0.7 and more preferably between 0.25 and 0.35. A ratio of the minimum to the average radius, $R_M/R_A$, is preferably between 0.3 and 1.0 and more preferably between 0.5 and 1.0.

The airfoil geometry of the transition section BC near the leading edge is constrained by the following relationships between leading edge sweep angle, $\Lambda$, airfoil nose camber, $\eta$, and chordwise extent of nose camber, $\xi_T$:

$$\frac{\eta}{\eta_0} = \left(1 - \frac{\xi}{\xi_T}\right)^2; 0 < \xi < \xi_T$$

$$\eta_0 = .1\xi_T = .006 \tan^{1/3}\Lambda$$

The lower element 1103 generally comprises a ventral fin, EF. The lower element 1103 has a generally wing-like configuration attached to the upper element 1102. The lower element 1103 may be attached to the upper element 1102 along the transition section BC at a generally 90° angle which facilitates adjusting the lower element 1103 relative to the local wing vector.

The general geometry of both the upper element 1102 (identified by subscript 1) and the lower element 1103 (identified by subscript 2) are defined by a height from the wing plane ($h_1$ and $h_2$); cant angle ($\phi_1$, $\phi_2$); incidence angle ($i_1$, $i_2$); sweep angle ($\Lambda_1$, $\Lambda_2$); and blade taper ($\lambda_1$, $\lambda_2$). It will be appreciated that the geometry determines the aerodynamic loading, which is critical to enhancement of the airplane performance characteristics. Generally, the geometric parameters are selected so as to minimize drag without incurring structural or weight changes which might offset or compromise the drag benefits or adversely affect other characteristics. An optimization process results in the optimum combination of independent geometric parameters while satisfying the constraints that apply to the dependent design parameters selected for a given application. The above identified parameters are mostly independent parameters, although they may be considered dependent for certain applications. Additional dependent parameters may include, a loading split ratio, an allowable wing bending moment, an extent of structural modification, a winglet size, airplane operating limitations, economic and business requirements, and an adaptability. Generally, the design restrictions for optimization of the split blended winglet 1100 will be more complex than the traditional blended winglet technology.

The upper and lower elements 1102, 1103 are each oriented at a cant angle with respect to the wing normal. The cant angle of the upper element 1102 is generally between zero and fifty degrees (i.e., 0°<$\phi_1$<50°), while the cant angle of the lower element 1103 is between ninety and one hundred eight degrees (i.e., 90°<$\phi_2$<180°).

Each of the first and second elements 1102, 1103 includes a tapered near-planar section. These sections include a taper ratio generally in the range of approximately 0.28 and 0.33 for the first element (i.e., 0.28<$\lambda_1$<0.33) and approximately 0.33 and 0.4 for the second element (i.e., 0.33<$\lambda_2$<0.4). The split winglet includes a surface area corresponding to a design lift coefficient $C_L$ in the range of approximately 0.6 and 0.7 (i.e., 0.6<$C_L$<0.7) and a thickness ratio corresponding to the section life coefficient which meets the following criteria at the design operating condition:

Winglet $M_{crit}$=Wing $M_{crit}$+0.01

The leading edge and curves of both the upper and lower elements 1102, 1103 each varies monotonically with a leading edge sweep angle ($\Lambda_1$, $\Lambda_2$) up to 65°. The leading edge curves and sweep angles are correlated with airfoil section nose camber so as to substantially prevent or reduce formation of leading edge vortices. The elements 1102, 1103 may be limited in cant angle, curvature, height or surface area so as to optimize performance over the flight envelope with minimal impact on wing structural requirements which affect weight, cost, or airplane economics.

Figure 12:
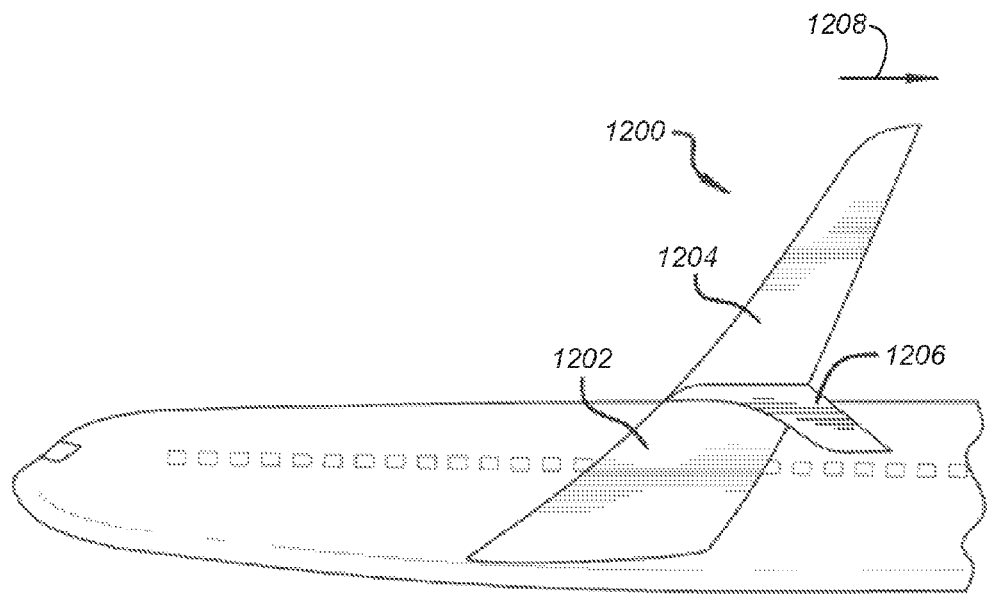
FIG. 12 illustrates an airplane comprising an exemplary embodiment of a split winglet in accordance with the present invention.

FIG. 12 illustrates another embodiment of the split winglet design. As illustrated in FIG. 12, a split winglet 1200 comprises a continuous projection of a wing 1202 into an upper section 1204, extending above the plane of the wing 1202, and a lower section 1206 extending below the plane of the wing 1202. Leading edges of the upper and lower sections 1204, 1206 emanate from a common point along the leading edge of the tip of the wing 1202. Trailing edges of the upper and lower sections 1204, 1206 similarly emanate from a common point along the trailing edge of the wing tip. The leading edges of both the upper and lower sections 1204, 1206 may comprise a generally linear portion with a smooth curved transition from the wing 1202 to the linear portion. The winglet tips of the upper and lower sections 1204, 1206 may curve toward a free airstream direction 1208. The trailing edges may generally project linearly to the respective ends of the winglet sections 1204, 1206. In some embodiments, the trailing edge of either or both of the upper and lower sections 1204, 1206 may further comprise a curved portion extending from the common point. It will be appreciated that the curved portions reduce the chord length of the respective sections 1204, 1206, such that the upper and lower sections 1204, 1206 comprise a variable taper and thus may be greater along a portion of the sections 1204, 1206 than from the wing. In an embodiment, the upper surface of the wing 1202 transitions continuously into an upper surface of the section 1204, and the lower surface of the wing 1202 transitions continuously into a lower surface of the section 1206. In another embodiment, the split winglet 1200 further comprises a continuous junction between a lower surface of the section 1204 and an upper surface of the section 1206.

Figure 13:
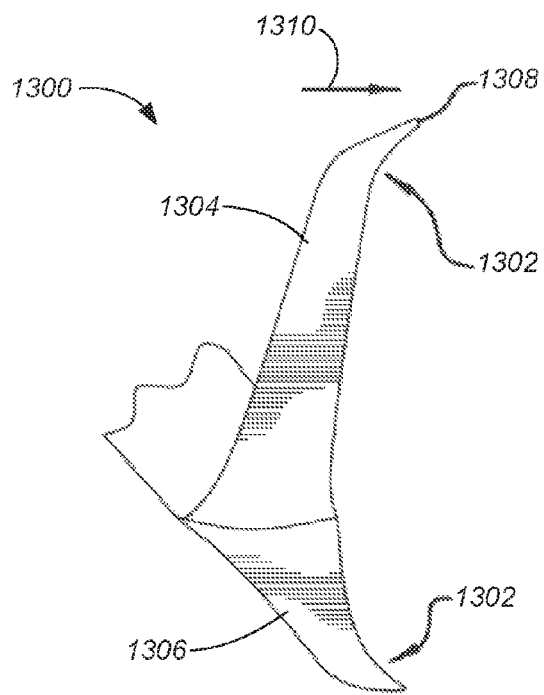
FIG. 13 illustrates an exemplary embodiment of a split winglet comprising a tip configuration according to embodiments of the present invention.

FIG. 13 illustrates and exemplary embodiment of a split winglet 1300 comprising an upper section 1304 and a lower section 1306. The split winglet 1300 is substantially similar to the split winglet 1200, illustrated in FIG. 12, with the exception that the split winglet 1300 comprises a different tip configuration 1302. In some embodiments, the upper and lower sections 1304, 1306 may comprise various features, including by way of non-limiting example, leading and trailing edges, winglet surface contours, a transition profile between the winglet and the wing, and winglet tip profiles. As previously disclosed, the leading and trailing edges of the winglet sections 1304, 1306 may comprise continuous extensions of leading and trailing edges of the wing. Further, the taper of the sections 1304, 1306 may also be greater than that of the wing and may be variable long its length. In some embodiments, utilizing continuous leading and trailing edge designs, a transition to the greater taper may occur along either the leading edge, the trailing edge, or a combination of both. In other embodiments, the lower section 1306 (i.e., the ventral fin) may comprise the same chordwise span as the upper section 1304 and wing, or may be reduced, such that either the leading edge and/or the trailing edge of the section 1306 extends from a lower surface of either the wing or the upper section 1304. In some embodiments, the tip configuration 1302 may comprise various formations or curvatures, depending on the application. In the embodiment illustrated in FIG. 13, an additional tip edge 1308 is included between the leading and trailing edges of the sections 1304, 1306. In some embodiments, either or both of the leading and trailing edges may be curved toward the free airstream direction 1310.

Figure 14:
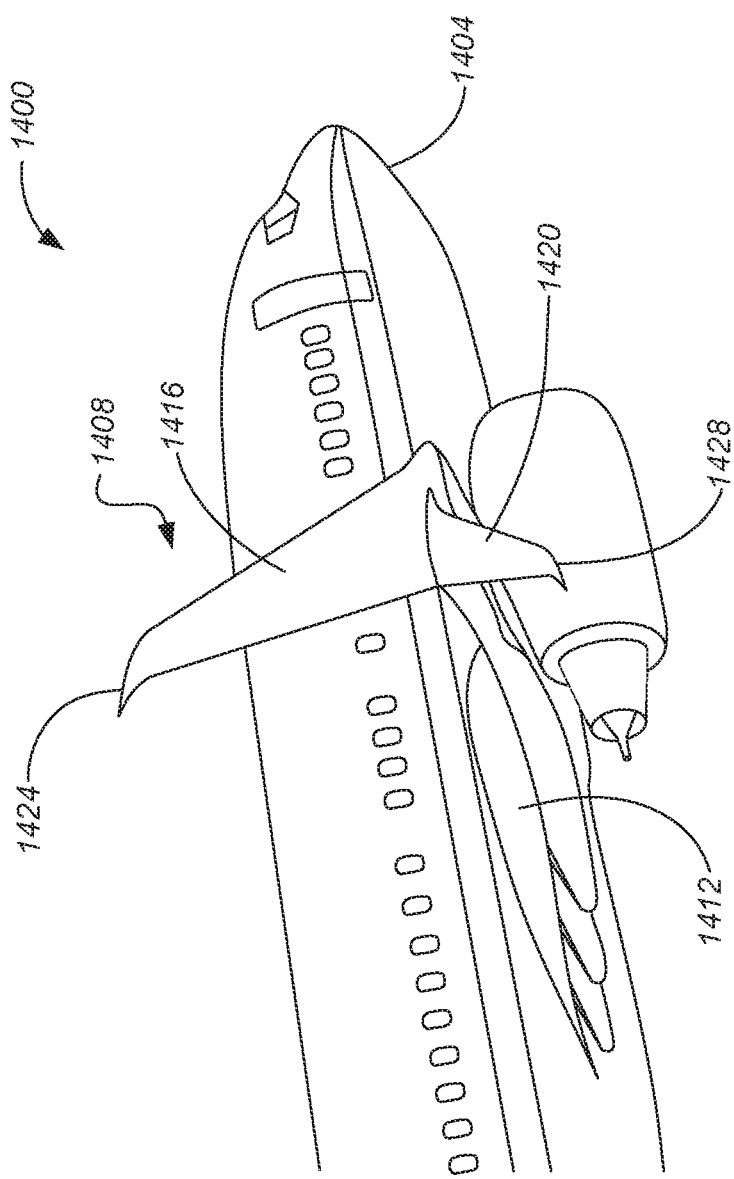
FIG. 14 illustrates an exemplary use environment wherein an airplane comprises a split winglet including a curved blade tip configuration in accordance with an embodiment of the present invention.

FIG. 14 illustrates an exemplary use environment 1400 wherein an airplane 1404 comprises a split winglet 1408 installed onto a wing 1412 of the airplane in accordance with an embodiment of the present invention. The split winglet 1408 comprises an upper winglet 1416 extending from a tip of the wing 1412, above a chord plane of the wing, and a ventral fin 1420 projecting below the chord plane from a lower surface of the upper winglet 1416. The split winglet 1408 illustrated in FIG. 14 is substantially similar to the split winglet 900 of FIGS. 9A-9C, with the exception that the split winglet 1408 comprises an upper winglet tip configuration 1424 and a ventral fin tip configuration 1428, both of which resembling a curved blade which is discussed in more detail with reference to FIGS. 15-16. It should be understood, however, that the tip configurations 1424, 1428 may comprise various combinations of segments, curvatures, or other geometric formations, depending on the application envisioned, without straying beyond the spirit and scope of the present invention.

Figure 15A:
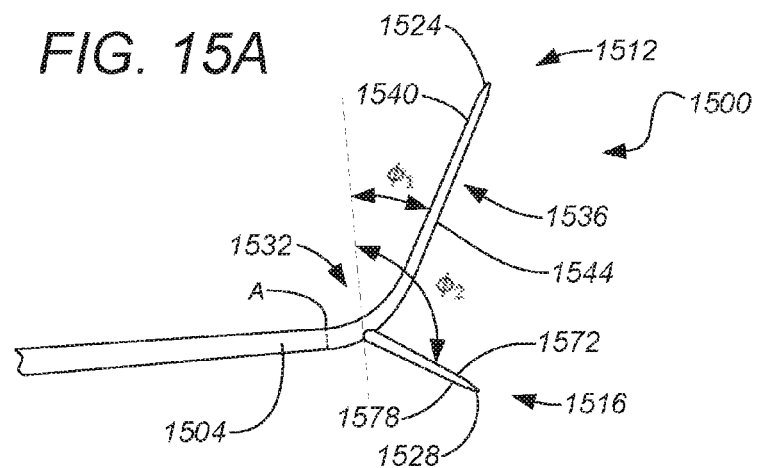
FIG. 15A is a front profile view of an exemplary embodiment of a split winglet comprising a curved blade tip configuration in accordance with the present invention.
Figure 15B:
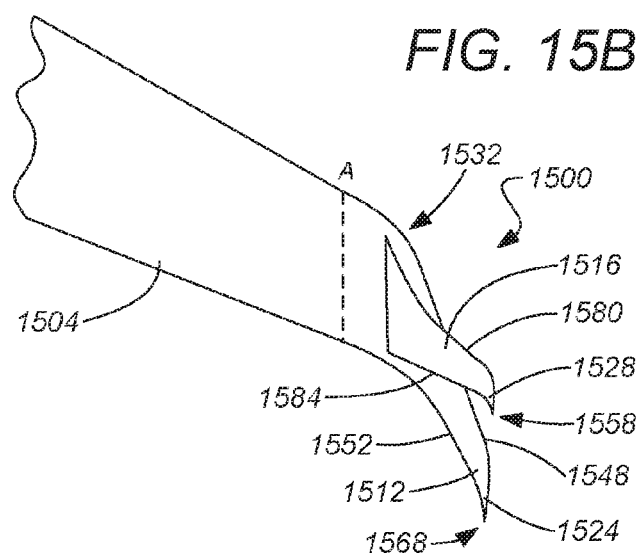
FIG. 15B is a bottom view of the embodiment of the split winglet illustrated in FIG. 15A.
Figure 15C:
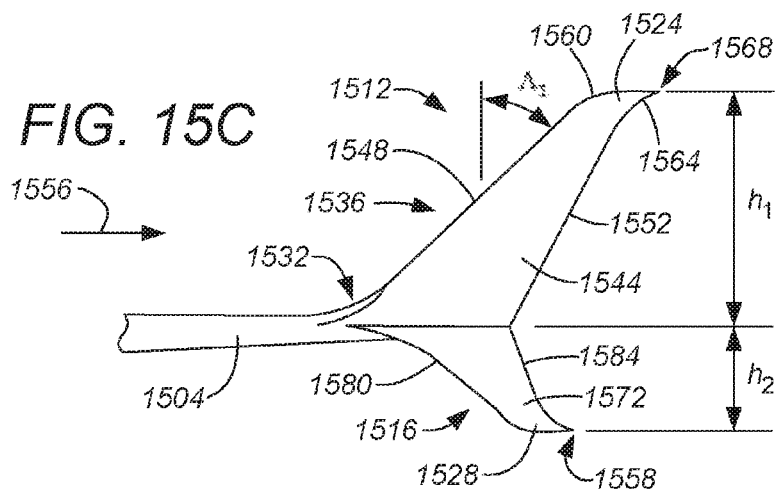
FIG. 15C is a side view of the embodiment of the split winglet illustrated in FIGS. 15A-15B.

FIGS. 15A-15C illustrate an exemplary embodiment of a split winglet 1500 configured for installation onto a wing tip 1504 of an airplane in accordance with the present invention. The split winglet 1500 comprises an upper winglet 1512 extending from the wing tip 1504 above a chord plane of the wing and a ventral fin 1516 projecting below the chord plane from a lower surface 1520 of the upper winglet 1512. The split winglet 1500 illustrated in FIGS. 15A-15C is substantially similar to the split winglet 900 of FIGS. 9A-9C, with the exception that the split winglet 1500 comprises an upper winglet tip configuration 1524 and a ventral fin tip configuration 1528, as discussed below.

Similar to the upper winglet 906, the upper winglet 1512 generally comprises a transition section 1532 which curves upward from the wing tip 1504 into a substantially planar section 1536. In an embodiment, the transition section 1532 comprises a substantially constant radius of curvature between the wing tip 1504 and the planar section 1536. In another embodiment, the transition section 1532 comprises two or more radii of curvature disposed along a length of the transition section 1532 between the wing tip 1504 and the planar section 1536. In other embodiments, the transition section 1532 may comprise a continuously changing radius of curvature along a length of the transition section 1532 between the wing tip 1504 and the planar section 1536. In still other embodiments, the transition section 1532 may comprise a substantially nonlinear curvature along a length of the transition section 1532 between the wing tip 1504 and the planar section 1536.

The upper winglet 1512 further comprises an upper surface 1540 and a lower surface 1544 proximally bounded by a leading edge 1548 and distally bounded by a trailing edge 1552. The upper surface 1540 and the lower surface 1544 of the upper winglet 1512 are respective smooth extensions of upper and lower surfaces of the wing tip 1504, such that the leading and trailing edges 1548, 1552 of the upper winglet 1512 are respectively continuous extensions of a leading edge and a trailing edge of the wing 1504. As illustrated in FIG. 15C, the leading edge 1548 and the trailing edge 1552 comprise substantially linear sections which are swept toward an airstream direction 1556 which is substantially parallel with the root chord of the wing 1504. The leading and trailing edges 1548, 1552 converge at the upper winglet tip configuration 1524.

In the illustrated embodiment, the upper winglet tip configuration 1524 comprises a first curve 1560 of the leading edge 1548 having a first radius and a second curve 1564 of the trailing edge 1552 having a second radius. As best illustrated in FIG. 15C, the first and second curves 1560, 1564 orient the leading and trailing edges 1548, 1552 toward the airstream direction 1556 so as to converge to substantially a point 1568 distal of the wing tip 1504 of the airplane. It will be recognized that the first and second curves 1560, 1564 give the upper winglet tip configuration 1524 a curved blade shape. In another embodiment, the first and second curves 1560, 1564 may be considerably smaller than as illustrated in FIG. 15C, and coupled with suitable linear segments, thereby configuring the upper winglet tip configuration 1524 into any of a variety of distally oriented protrusions. In some embodiments, the first and second curves 1560, 1564 may each be a compound curve comprising two or more different radii, such that the leading and trailing edges 1548, 1552 converge at the point 1568. In other embodiments, the first and second curves 1560, 1564 may each comprise a continuously changing radius of curvature along each of the curves 1560, 1564, such that the leading and trailing edges 1548, 1552 converge at the point 1568. In still other embodiments, the upper winglet tip configuration 1524 may comprise configurations other than shown and described herein without detracting from the present invention.

Referring again to FIG. 15A, the ventral fin 1516 projects below the chord plane from the lower surface 1544 of the transition section 1532. Similar to the ventral fin 902, the ventral fin 1516 comprises an upper surface 1572 and a lower surface 1576 proximally bounded by a leading edge 1580 and distally bounded by a trailing edge 1584. The leading and trailing edges 1580, 1584 comprise substantially linear sections which are swept toward the airstream direction 1556 and then converge at the ventral fin tip configuration 1528.

The ventral fin tip configuration 1528 is substantially similar to the upper winglet tip configuration 1524, with the exception that the ventral fin tip configuration 1528 is generally smaller in size due to the smaller dimensions of the ventral fin 1516 compared to the upper winglet 1512. Similar to the upper winglet tip configuration 1524, in the illustrated embodiment of the ventral fin tip configuration 1528, the leading edge 1580 and the trailing edge 1584 curve toward the airstream direction 1556 and then terminate at substantially a point 1558 distal of the wing tip 1504 of the airplane. It should be understood that in other embodiments, the ventral fin tip configuration 1528 may comprise a wide variety of configurations other than shown and described herein without detracting from the present invention.

In the embodiment illustrated in FIGS. 15C-15C, the leading edge 1580 of the ventral fin 1516 merges into the lower surface 1544 of the upper winglet 1512 distal of the leading edge 1548 of the upper winglet 1512, and the trailing edge 1584 merges into the trailing edge 1552 of the upper winglet 1512. In some embodiments, the leading edge 1548 of the upper winglet 1512 and the leading edge 1580 of the ventral fin 1516 merge together at the transition section 1532, such that the leading edges 1548, 1580 are continuous extensions of the leading edge of the wing 1504. In some embodiments, the trailing edge 1552 of the upper winglet 1512 and the trailing edge 1584 of the ventral fin 1516 merge together at the transition section 1532, such that the trailing edges 1552, 1584 are continuous extensions of the trailing edge of the wing 1504. It will be recognized that the ventral fin 1516 may be coupled to the upper winglet 1512 in a variety of diverse configurations, and thereby placing the edges of the upper winglet 1512, the ventral fin 1516, and the wing 1504 into various relationships, without deviating from the spirit and the scope of the present invention.

Figure 16A:
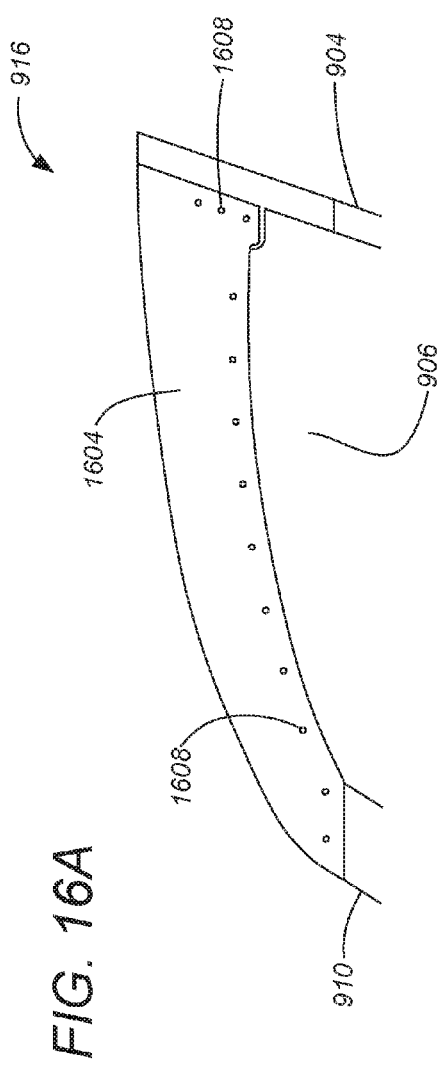
FIG. 16A is an enlarged section view of a winglet tip cap of an upper winglet illustrated in FIG. 9C.
Figure 16B:
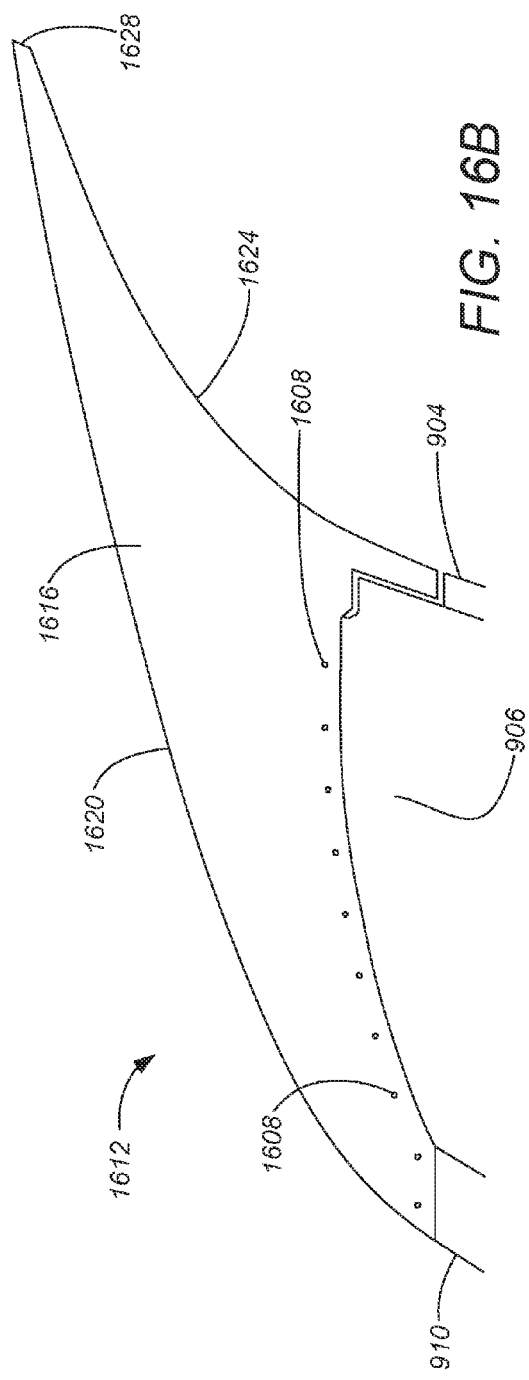
FIG. 16B is an enlarged section view a curved blade cap installed onto the upper winglet illustrated in FIG. 16A.

FIGS. 16A-16B illustrate an exemplary embodiment of a winglet retrofitting, whereby the upper winglet 906 illustrated in FIGS. 9A-9C is modified so as to resemble the upper winglet 1512 illustrated in FIGS. 15A-15C. FIG. 16A is an enlarged section view of the upper winglet 906 illustrating the winglet tip configuration 916, as shown in FIG. 9C. The winglet tip configuration 916 comprises a winglet tip cap 1604 fixedly attached to the upper winglet 906 by way of a multiplicity of fasteners 1608. FIG. 16B is an enlarged section view of the upper winglet 906 after having been retrofitted with a curved blade cap 1616, thereby producing a curved blade tip configuration 1612 which resembles the upper winglet tip configuration 1524 illustrated in FIG. 15C. It will be appreciated that the curved blade cap 1616 is suitably configured for installation onto the upper winglet 906 in place of the winglet tip cap 1604. Generally, the fasteners 1608 and the winglet tip cap 1604 are removed from the upper winglet 906, and the curved blade cap 1616 is then installed onto the upper winglet 906 and secured by way of the original fasteners 1608, thereby implementing the split winglet 900 with an upper winglet which is substantially similar to the upper winglet 1512 illustrated in FIGS. 15A-15C.

The curved blade cap 1616 comprises a first curve 1620 and a second curve 1624, both of which terminating at a distal segment 1628. As discussed with reference to FIGS. 15A-15C, the first and second curves 1620, 1624 may each be a compound curve comprising two or more different radii, such that the leading and trailing edges of the curved blade cap 1616 converge at the distal segment 1628. In other embodiments, however, the first and second curves 1620, 1624 may each comprise a continuously changing radius of curvature, such that the leading and trailing edges of the curved blade cap 1620, 1624 converge at the distal segment 1628. In other embodiments, the curved blade cap 1616 may comprise a distal point, as illustrated in FIG. 15C, in lieu of the distal segment 1628. In still other embodiments, the curved blade cap 1616 may comprise configurations other than shown and described herein without detracting from the present invention. Moreover, it should be understood that the winglet retrofitting illustrated in FIGS. 16A-16B is not limited solely to the upper winglet 906, but rather a substantially similar retrofit to the ventral fin 902 may be preformed, such that the ventral fin 902 resembles the ventral fin 1516 illustrated in FIGS. 15A-15C.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Variations contemplated within the scope of the invention include embodiments incorporating one or more features of the various features described herein in any combination without limitation. In addition, embodiments and features described herein may be used in other types of applications not specifically discussed, such as by way of non-limiting example: water craft, other aircraft, or applications generally intended to move gas or liquid. For example, water craft including propellers, helicopters, and propeller airplanes are all understood to benefit from one or more embodiments described herein. Alternatively, fans, including ventilation systems, are also understood to benefit from one or more embodiments described herein. Therefore, the present invention is to be understood as not limited by the specific embodiments described herein, but only by scope of the appended claims.

What is claimed is:

1. A retrofitting for a winglet attached to a wing tip of a wing, the winglet including a winglet leading edge and a winglet trailing edge, comprising:
    a curved blade cap designed for attachment to the winglet, the curved blade cap comprising:
        a blade cap leading edge having a first curve with a first radius, the blade cap leading edge designed for alignment with the winglet leading edge;
        a blade cap trailing edge having a second curve with a second radius, the blade cap trailing edge designed for alignment with the winglet trailing edge; and
        a distal segment oblique to the first curve and the second curve, wherein the first curve terminates at a first end of the distal segment and the second curve terminates at a second end of the distal segment opposite the first end.

2. The retrofitting according to claim 1, wherein the winglet extends from the wing tip above a chord plane of the wing, the winglet comprising an upper surface and a lower surface bounded by the winglet leading edge and the winglet trailing edge swept toward an airstream direction substantially parallel with a root chord.

3. The retrofitting according to claim 1, wherein at least one of the first curve and the second curve is a compound curve comprising at least a first curve portion having a first radius and a second curve portion having a second radius.

4. The retrofitting according to claim 1, wherein at least one of the first curve and the second curve comprises a radius of curvature that continuously changes as a function of a length of the respective curve.

5. The retrofitting according to claim 4, wherein both the first curve and the second curve comprise a radius of curvature that continuously changes as a function of the length of the first curve and the second curve.

6. The retrofitting according to claim 1, wherein the winglet includes a tip cap, and wherein the curved blade cap is designed to replace the tip cap.

7. The retrofitting according to claim 6, wherein the curved blade cap includes a first plurality of openings positioned to align with a second plurality of openings in the winglet, and wherein the first and second plurality of openings are configured to receive a plurality of fasteners to attach the curved blade cap to the winglet.

8. A retrofitting, comprising:
    a curved blade cap providing at least one of a winglet tip configuration and a ventral fin tip configuration,
    the winglet tip configuration included on an upper winglet extending from a wing tip above a chord plane of a wing, the upper winglet comprising an upper surface and a lower surface bounded by a leading edge and a trailing edge swept toward an airstream direction and converging at the winglet tip configuration,
    the ventral fin tip configuration included on a ventral fin projecting below the chord plane from the upper winglet, the ventral fin comprising an upper surface and a lower surface bounded by a leading edge and a trailing edge swept toward the airstream direction and converging at the ventral fin tip configuration.

9. The retrofitting according to claim 8, wherein the curved blade cap is provided as both the winglet tip configuration and the ventral fin tip configuration.

10. The retrofitting according to claim 8, wherein the curved blade cap comprises:
    a leading edge having a first curve with a first radius;
    a trailing edge having a second curve with a second radius; and
    a distal segment oblique to the first curve and the second curve, wherein the first curve terminates at a first end of the distal segment and the second curve terminates at a second end of the distal segment opposite the first end.

11. The retrofitting according to claim 8, wherein the upper winglet further comprises a transition section which curves upward from the wing tip into a substantially planar section, wherein the upper surface and the lower surface of the upper winglet respectively are continuous extensions of an upper surface and a lower surface of the wing tip, and wherein the leading edge and the trailing edge of the upper winglet respectively are continuous extensions of a leading edge and a trailing edge of the wing.

12. The retrofitting according to claim 11, wherein the transition section comprises a substantially constant radius of curvature between the wing tip and the substantially planar section.

13. The retrofitting according to claim 11, wherein the transition section comprises at least a first portion having a first radius and a second portion having a second radius disposed along a length of the transition section between the wing tip and the substantially planar section.

14. The retrofitting according to claim 11, wherein the transition section comprises a curvature that continuously changes as a function of a length of the transition section between the wing tip and the substantially planar section.

15. The retrofitting according to claim 11, wherein the ventral fin projects from a lower surface of the transition section and extends below the chord plane.

16. The retrofitting according to claim 11, wherein the ventral fin merges into the lower surface of the upper winglet distal of the leading edge of the upper winglet.

17. The retrofitting according to claim 16, wherein the trailing edge of the ventral fin merges into the trailing edge of the upper winglet.

18. The retrofitting according to claim 11, wherein the leading edge of the upper winglet and the leading edge of the ventral fin merge together at the transition section, wherein the leading edge of the upper winglet and the leading edge of the ventral fin are continuous extensions of the leading edge of the wing.

19. The retrofitting according to claim 11, wherein the trailing edge of the upper winglet and the trailing edge of the ventral fin merge together at the transition section, wherein the trailing edge of the upper winglet and the trailing edge of the ventral fin are continuous extensions of the trailing edge of the wing.

* * * * *